United States Patent
Sasaki et al.

(10) Patent No.: US 8,431,859 B2
(45) Date of Patent: Apr. 30, 2013

(54) STRESS TREATMENT DEVICE, OPERATING SYSTEM, AND METHOD OF MAKING TURBINE

(75) Inventors: Hidekazu Sasaki, Kawasaki (JP); Itaru Chida, Kawasaki (JP); Itaru Murakami, Tokyo (JP); Hiroshi Nomura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/303,199

(22) Filed: Nov. 23, 2011

(65) Prior Publication Data
US 2012/0125897 A1 May 24, 2012

Related U.S. Application Data

(63) Continuation of application No. PCT/JP2010/003599, filed on May 28, 2010.

(30) Foreign Application Priority Data

May 29, 2009 (JP) ................. P2009-131544

(51) Int. Cl.
*B23K 26/00* (2006.01)
(52) U.S. Cl.
USPC ............... 219/121.6; 219/121.84; 219/121.85
(58) Field of Classification Search ............... 219/121.6, 219/121.63–121.72, 121.84, 121.85
See application file for complete search history.

(56) References Cited

U.S. PATENT DOCUMENTS

| 2008/0105666 A1 | 5/2008 | Adachi et al. |
| 2009/0317286 A1 | 12/2009 | Nishi |
| 2011/0183271 A1* | 7/2011 | Lee et al. ........... 430/323 |
| 2012/0074105 A1* | 3/2012 | Okamoto et al. ...... 219/121.62 |

FOREIGN PATENT DOCUMENTS

| DE | 60 2004 002906 T2 | 9/2007 |
| EP | 1911855 A1 | 4/2004 |
| EP | 1507015 A1 | 2/2005 |
| JP | 63-248901 | 10/1988 |
| JP | 2005-060727 | 3/2005 |
| JP | 2005-313191 | 11/2005 |
| JP | 2007-030008 | 2/2007 |
| JP | 2008-087029 | 4/2008 |

OTHER PUBLICATIONS

International Preliminary Report on Patentability and Written Opinion issued Dec. 12, 2011 in PCT/JP2010/003599 (English translation only).
International Search Report mailed on Jul. 20, 2010, with English translation, issued for International Application No. PCT/JP2010/003599, filed on May 28, 2010.
International Written Opinion mailed on Jul. 20, 2010, issued for International Application No. PCT/JP2010/003599, filed on May 28, 2010.

* cited by examiner

*Primary Examiner* — Samuel M Heinrich
(74) *Attorney, Agent, or Firm* — Oblon, Spivak, McClelland, Maier & Neustadt, L.L.P.

(57) ABSTRACT

A stress treatment device has an operating unit including a head unit performing peening by irradiating an inside of a hole formed in a structure with laser to form a compressive stress region in the hole; a laser unit having an optical fiber guiding the laser to the head unit; a jetting unit jetting liquid into the hole; and a support part supporting the optical fiber in a manner of allowing the jetted liquid to flow through and being fixed in the head unit.

18 Claims, 34 Drawing Sheets

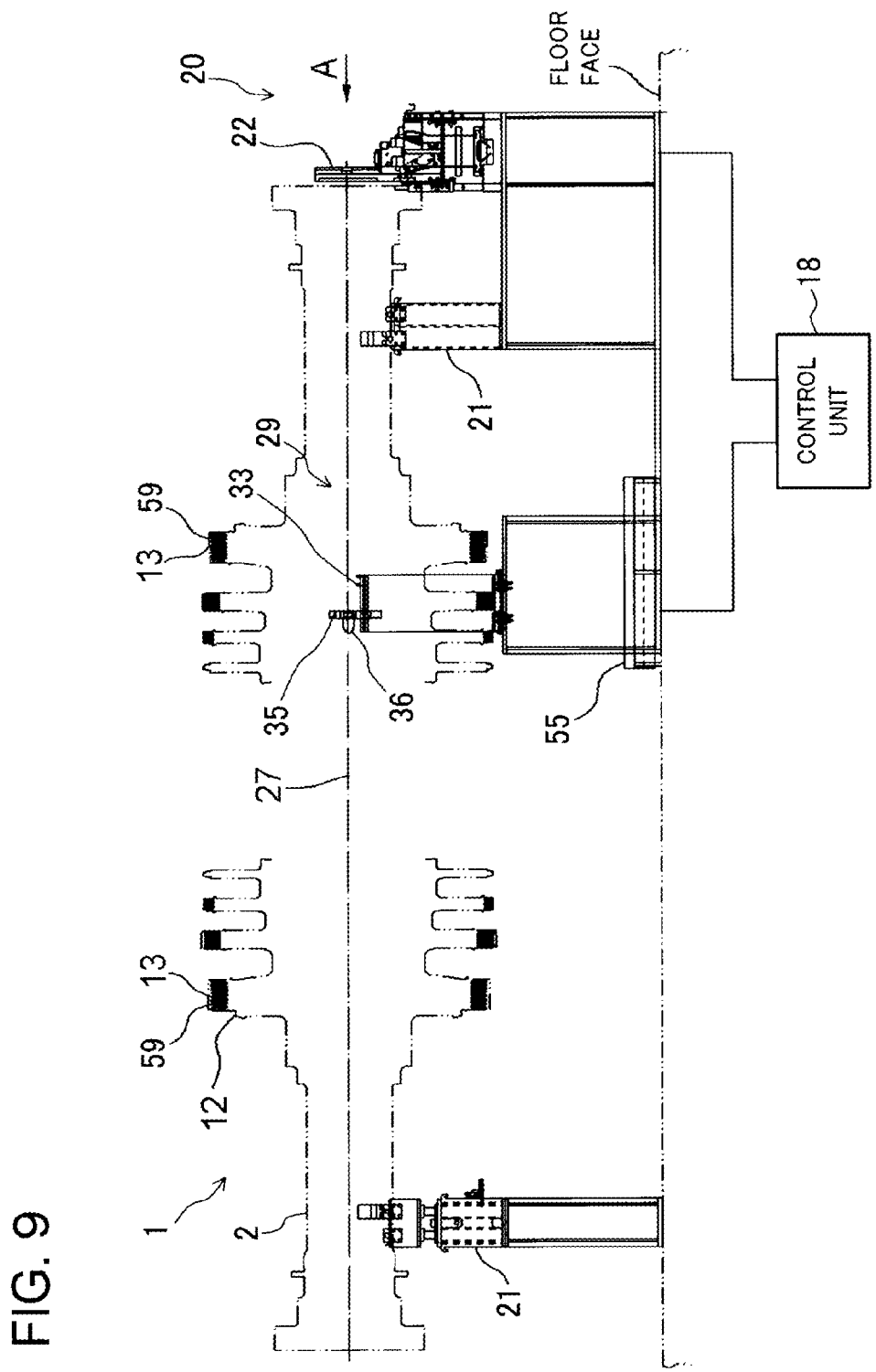

OPERATING TIME

STRESS TREATMENT DEVICE, OPERATING SYSTEM, AND METHOD OF MAKING TURBINE

CROSS-REFERENCE TO RELATED APPLICATION

This application is a continuation of prior International Application No. PCT/JP2010/003599, filed on May 28, 2010 which is based upon and claims the benefit of priority from Japanese Patent Application No. 2009-131544, filed on May 29, 2009; the entire contents of all of which are incorporated herein by reference.

FIELD

Embodiments described herein relate generally to a stress treatment device, an operating system, and a method of making a turbine in which stress improvement treatment is performed on a structure, for example, one or both of a turbine rotor blade and a disk.

BACKGROUND

A steam turbine is made up of a large number of turbine rotor blades implanted in a circumferential direction of a rotor and stator blades (nozzles) fixed to a turbine casing. A combination of a turbine rotor blade and a stator blade forms a turbine stage. By arranging a plurality of turbine stages on disks, a steam turbine is formed. The turbine rotor blades and the disks are formed of, for example, a material (for example, high-strength copper) with high tensile strength of 500 kg/mm² or higher in order to endure centrifugal force during operation, and are coupled by a fork structure for example. This material with high tensile strength is sensitive to stress-corrosion cracking (hereinafter referred to as "SCC").

Large centrifugal force acts on a coupling portion of a turbine rotor blade and a disk accompanying rotation of the steam turbine, and also steam enters this coupling portion via gaps. As a result, SCC occurs in this coupling portion due to aging caused by accumulation of corrosive products such as Na and Cl contained in the steam.

In recent years, to improve efficiency of steam turbines, there is a tendency for employing a turbine blade with a long blade length for the purpose of decreasing exhaust loss in a low-pressure final stage. However, accompanying increase in blade length, the centrifugal force acting on this blade increases. Accordingly, the coupling portion of a blade and a disk needs to have sufficient strength against low-cycle fatigue accompanying start and stop and high-cycle fatigue under high mean stress and in a corrosive environment.

Accordingly, there has been proposed a method to perform shot peening on the surface of a pin or the like for coupling a turbine rotor blade and a disk to add compressive residual stress, in order to suppress occurrence of SCC.

However, the above-described prior art shoots a large amount of projectiles to an operating range by shot peening, and thus how it is performed uniformly within this operating range is a matter of probability. Therefore, when the shot peening is applied to both the pin and a pin hole, if the shot peening is performed unevenly, a tolerance between the diameter of the pin and the diameter of the pin hole surpasses an allowable range, and there is a possibility that precise coupling is impaired.

BRIEF DESCRIPTION OF THE DRAWINGS

FIG. 9 is a view for describing the structure of a stress treatment device according to Embodiment 2, and is a front view illustrating the case of performing stress improvement on the pin hole of the disk.

DETAILED DESCRIPTION

In one embodiment, a stress treatment device has an operating unit including a head unit performing peening by irradiating an inside of a hole formed in a structure with laser to form a compressive stress region in the hole; a laser unit having an optical fiber guiding the laser to the head unit; a jetting unit jetting liquid into the hole; and a support part supporting the optical fiber in a manner of allowing the jetted liquid to flow through and being fixed in the head unit.

Embodiment 1

Figure 1A:
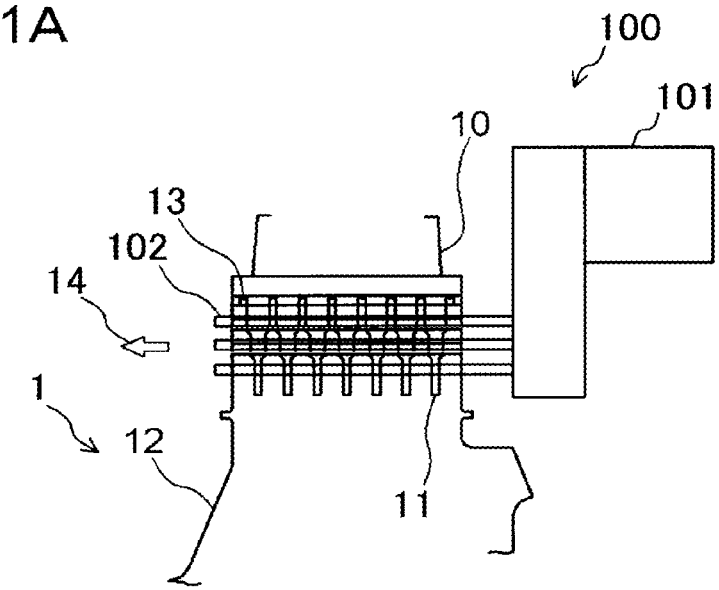
FIG. 1A is a front view illustrating a coupling structure of a turbine rotor blade and a disk for describing simultaneous reamer processing on the turbine rotor blade and the disk.
Figure 1B:
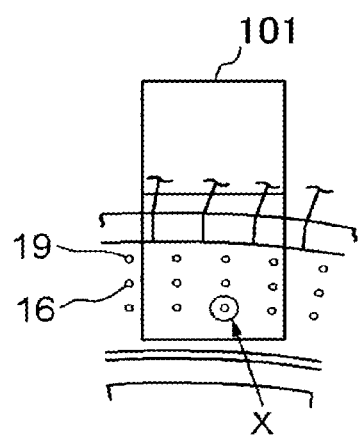
FIG. 1B is a side view illustrating the coupling structure of the turbine rotor blade and the disk for describing simultaneous reamer processing on the turbine rotor blade and the disk
Figure 1C:
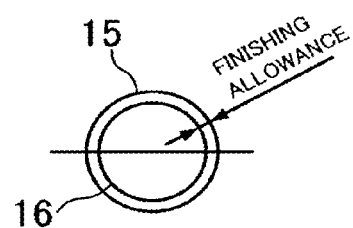
FIG. 1C is an enlarged view of an X part of a side face illustrating the coupling structure of the turbine rotor blade and the disk for describing simultaneous reamer processing on the turbine rotor blade and the disk.
Figure 2:
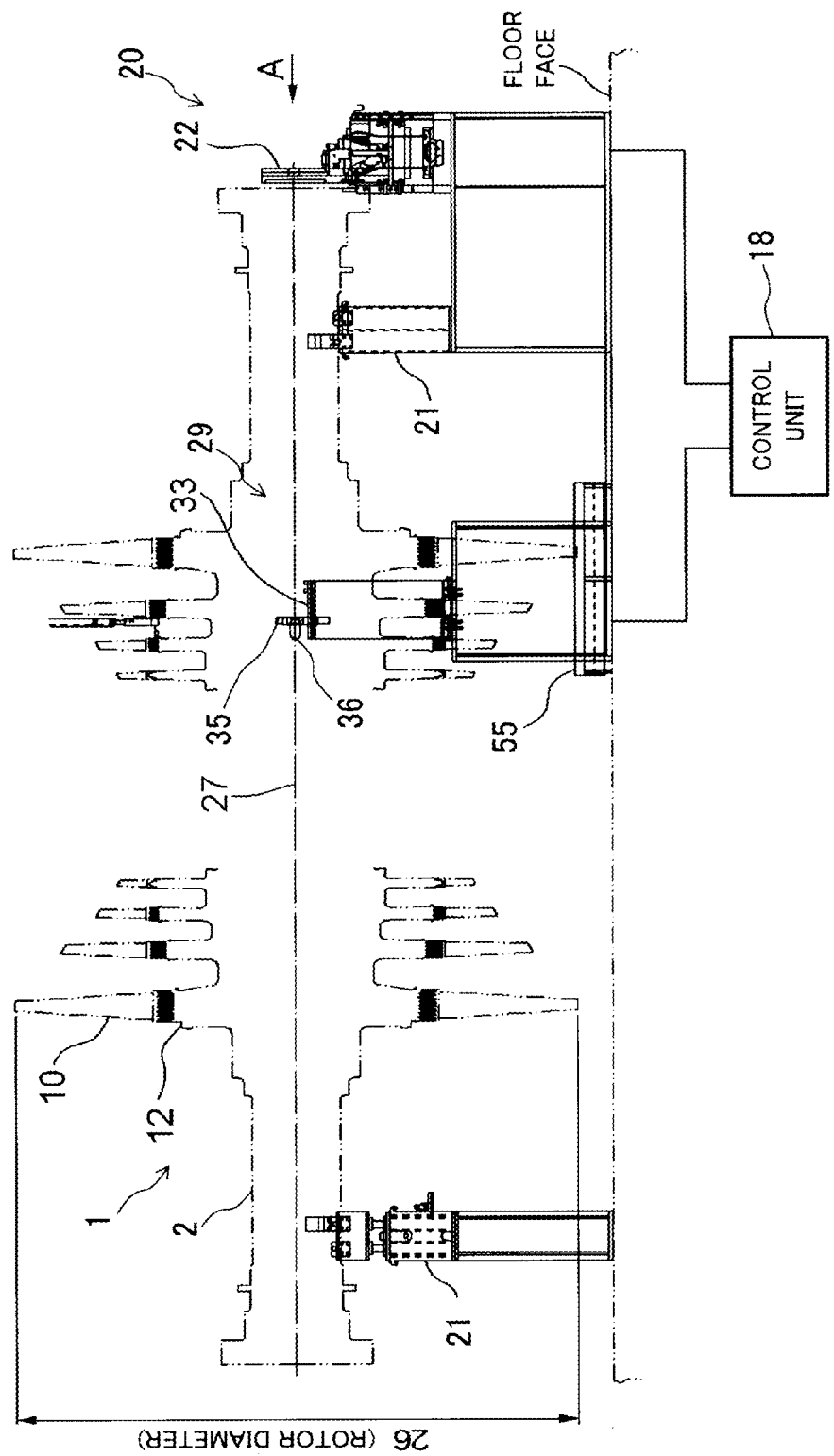
FIG. 2 is a view for describing the structure of a stress treatment device of embodiment 1, and is a front view illustrating the case of performing stress improvement on a pin hole of the coupling structure of the turbine rotor blade and the disk.
Figure 3:
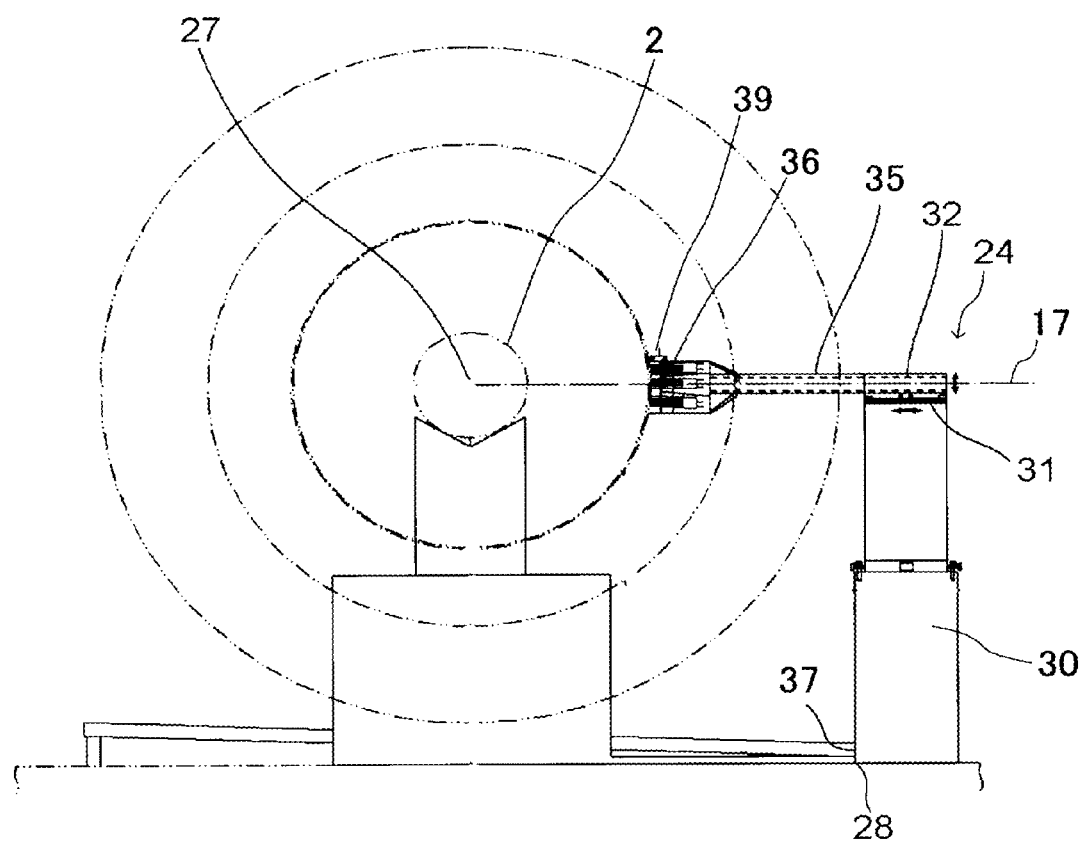
FIG. 3 is an arrow view illustrating a structure seeing FIG. 2 from an A direction.
Figure 4:
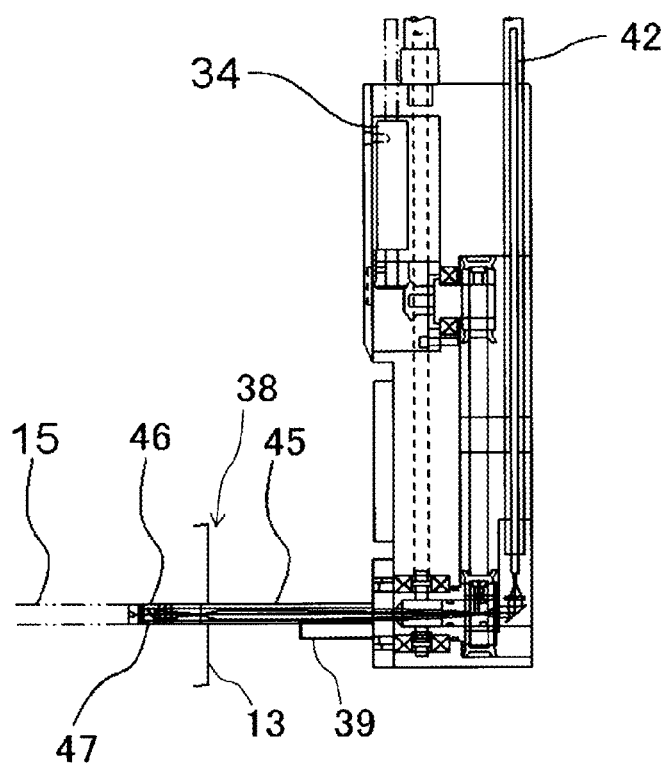
FIG. 4 is an enlarged view illustrating a head unit illustrated in FIG. 2.

Hereinafter, embodiments of the present invention will be described with reference to the drawings. FIG. 1A to FIG. 1C are views for describing simultaneous reamer processing on a turbine rotor blade 10 and a disk 12. FIG. 1A is a front view illustrating a coupling structure of the turbine rotor blade 10 and the disk 12, FIG. 1B is a side view, and FIG. 10 is an enlarged view of an X part in FIG. 1B. FIG. 2 is a view for describing the structure of a stress treatment device 24 of embodiment 1, and is a front view illustrating the case of performing stress improvement on a pin hole 15 of the coupling structure of the turbine rotor blade 10 and the disk 12. FIG. 3 is an arrow view illustrating a structure seeing FIG. 2 from an A direction. FIG. 4 is an enlarged view illustrating a head unit illustrated in FIG. 2. Note that in the following views and diagrams, the same numerals are added to similar component parts.

The turbine rotor blade 10 has a blade fork 11 on a lower end. The disk 12 of a rotor 1 has a disk fork 13 on an upper end. The blade fork 11 and the disk fork 13 are formed to be engageable with each other. Plural pins which will be described later are inserted in pin holes 15 provided to penetrate through the blade fork 11 and the disk fork 13, to thereby couple the turbine rotor blade 10 and the disk 12. In addition, in this turbine rotor blade 10, prepared holes 16 are formed in advance with a diameter smaller than a hole diameter of the pin hole 15 by about 0.5 mm to about 1.0 mm.

A reamer processing device 100 includes a rotation drive unit 101, plural reamer tools 102, and a not-illustrated moving unit. The rotation drive unit 101 rotates the plural reamer tools 102 simultaneously at the same speed. The rotation drive unit 101 and the reamer tools 102 are moved in an axial direction (arrow 14 direction in the view) of the pin hole 15 by the moving unit. The reamer processing device 100 functions as "a processing unit simultaneously reamer processing a turbine rotor blade having a blade fork and a disk of a rotor having a disk fork with which the blade fork engages".

The turbine rotor blade 10 is implanted in the disk 12, and thereafter a temporary pin 19 is inserted in a prepared hole 16 to position the prepared holes 16 on the same axis. Next, in the reamer processing device 100, the reamer tools 102 are rotated by the rotation drive unit 101 simultaneously at the same speed and are moved in the axial direction of the pin holes 15 to shave the prepared holes 16, thereby matching the pin holes 15. In this manner, by processing the plurality of pin holes 15 simultaneously, there is no positional displacement of the pin holes 15 of the turbine rotor blade 10 and the disk 12, thereby reducing a load on the pin holes 15 and the pins during operation. In addition, chips occurred in the pin holes 15 after the reamer processing are removed.

A structure of the stress treatment device 24 of this embodiment will be described. The stress treatment device 24 according to this embodiment performs peening on the pin holes 15 of the blade fork 11 and the disk fork 13 for the purpose of improving fatigue strength and removing residual stress.

In FIG. 2 to FIG. 4, the stress treatment device 24 includes a rotor rotating unit 20, an operating unit 29, and a control unit 18 drive controlling these units. The rotor rotating unit 20 includes V-blocks 21 and a rotor rotating device 22. The V-blocks 21 are disposed one each in either end of the rotor 1, and rotatably bear the both ends of the rotor 1. The rotor rotating device 22 is disposed in the vicinity of a distal end portion of the rotor 1. This rotor rotating device 22 has a stepping motor for example, and rotates the disk 12 about a center axis 27 of a shaft 2 of the rotor 1 to a predetermined position, allowing operation of the operating unit 29 at this predetermined position. This rotor rotating device 22 functions as "a rotor rotating unit rotating a rotor including a turbine rotor blade having the blade fork and a disk assembled by engaging with the blade fork and having the disk fork through which the pin hole is formed to penetrate together with the blade fork, so as to position the disk at a predetermined position".

The operating unit 29 is disposed in the vicinity of a front face of the rotor 1, and includes a base 30, a rotor radial direction drive unit 31, a rotor tangential direction drive unit 32, a head feeding drive unit 33, a head rotation drive unit 34, a boom 35, and a head unit 36.

The base 30 is structured to be movable in parallel with a radial direction 17 and the center axis 27 of the rotor 1. Here, the radial direction 17 of the rotor 1 denotes a direction in parallel with a horizontal direction.

The rotor radial direction drive unit 31 has a rotor radial direction drive shaft disposed on an upper side of the base 30 and moves the boom 35 in the radial direction 17 of the rotor 1.

The rotor tangential direction drive unit 32 has a rotor tangential direction drive shaft disposed in the boom 35 and moves the head unit 36 in a tangential direction of the rotor 1.

The head feeding drive unit 33 moves an operating head 38 of the head unit 36 in parallel with the center axis 27 of the rotor 1.

The head rotation drive unit 34 has a rotation motor disposed in the head unit 36 and rotates the operating head 38 of the head unit 36 in a manner that a compressive stress region, which will be described later, is formed in an inner face of the pin hole 15.

The boom 35 is formed of a plate having a battledore shape, as illustrated in FIG. 3, and the rotor tangential direction drive unit 32 is disposed inside. This boom 35 is set to have a smaller width than a gap between the turbine rotor blades 10 and the disks 12 of the final stage and the preceding stage thereof.

The head unit 36 is disposed on a distal end of the boom 35 and has the rotatable operating head 38. This operating head 38 is provided in a direction perpendicular to the boom 35 (perpendicular to the paper surface of FIG. 3).

In operation, the boom 35 is inserted from the gap between the turbine rotor blades and the disks of the final stage and the preceding stage thereof, and is positioned to the pin hole 15 as a target of operation. Then, this operating head 38 is rotated to perform peening on the inner face of the pin hole 15. This operating unit 29 functions as "an operating unit performing peening at the positioned predetermined position on at least one of an inner face of a pin hole of the blade fork and an inner face of a pin hole of the disk fork, so as to form a compressive stress region".

In this stress treatment device 24, a base side face 37 is made to abut a V-block side face 28 to allow centering so that the head unit 36 becomes in parallel with the center axis 27 of the rotor 1 and the V-block 21. Next, by the rotor radial direction drive unit 31 and the rotor tangential direction drive unit 32, the position of the operating head 38 is fine adjusted corresponding to the position of the pin hole 15 as the target of operation. Next, by the head feeding drive unit 33, the operating head 38 is moved in parallel with the center axis 27 of the rotor 1 in the pin hole 15, and this operating head 38 is rotated by the head rotation drive unit 34, allowing positioning of the pin hole 15 as the target of operation.

In addition, normally, 100 or more turbine rotor blades 10 are coupled to the circumference of the rotor 1. In such an environment, it is difficult to directly visually recognize the position of the pin hole 15 as the target of operation and the position of the operating head 38.

Accordingly, in the stress treatment device 24 according to this embodiment, an imaging unit 39 is provided in the vicinity of the operating head 38 so as to remotely recognize the position of the pin hole 15 and the position of the operating head 38. This imaging unit 39 has a monitoring camera and a light disposed around the monitoring camera. When the operating head 38 is positioned in the pin hole 15, a three-point measurement is performed by an image measurement method (image measurement program) for the contour of the pin hole 15 to recognize the center from an image taken by the monitoring camera, and a positional displacement from a reference hole is recognized. Based on this positional displacement, the rotor radial direction drive unit 31 and the rotor tangential direction drive unit 32 are drive controlled, and the operating head 38 is positioned with respect to the pin hole 15.

Thus, in the stress treatment device according to this embodiment, since the positional displacement between the operating head and a pin hole is corrected using an image measurement program from a taken image, the operating head can be positioned at a correct position of the pin hole.

Figure 5:
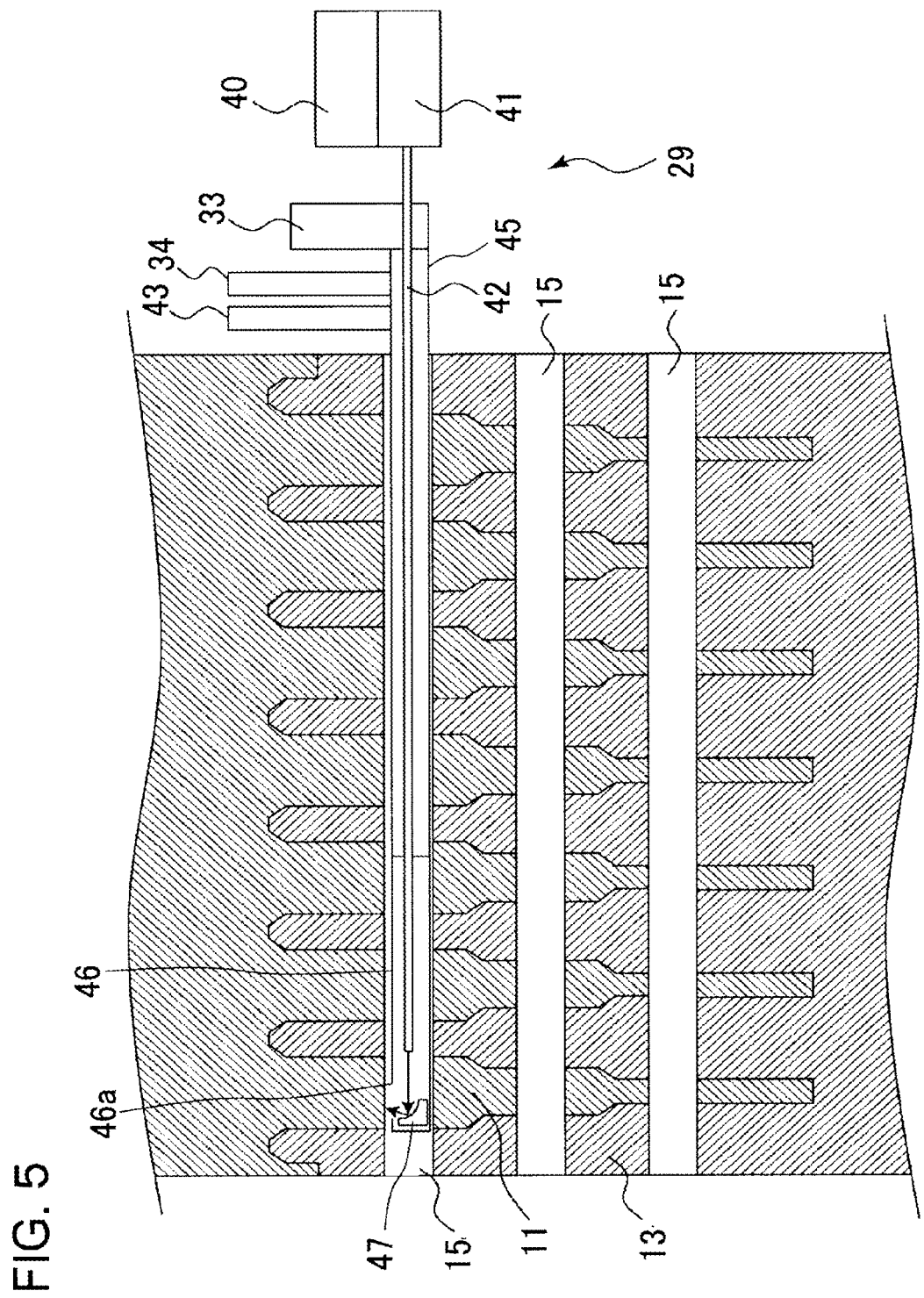
FIG. 5 is a cross-sectional view for describing a general structure of a laser peening device as an operating unit of the stress treatment device.
Figure 6:
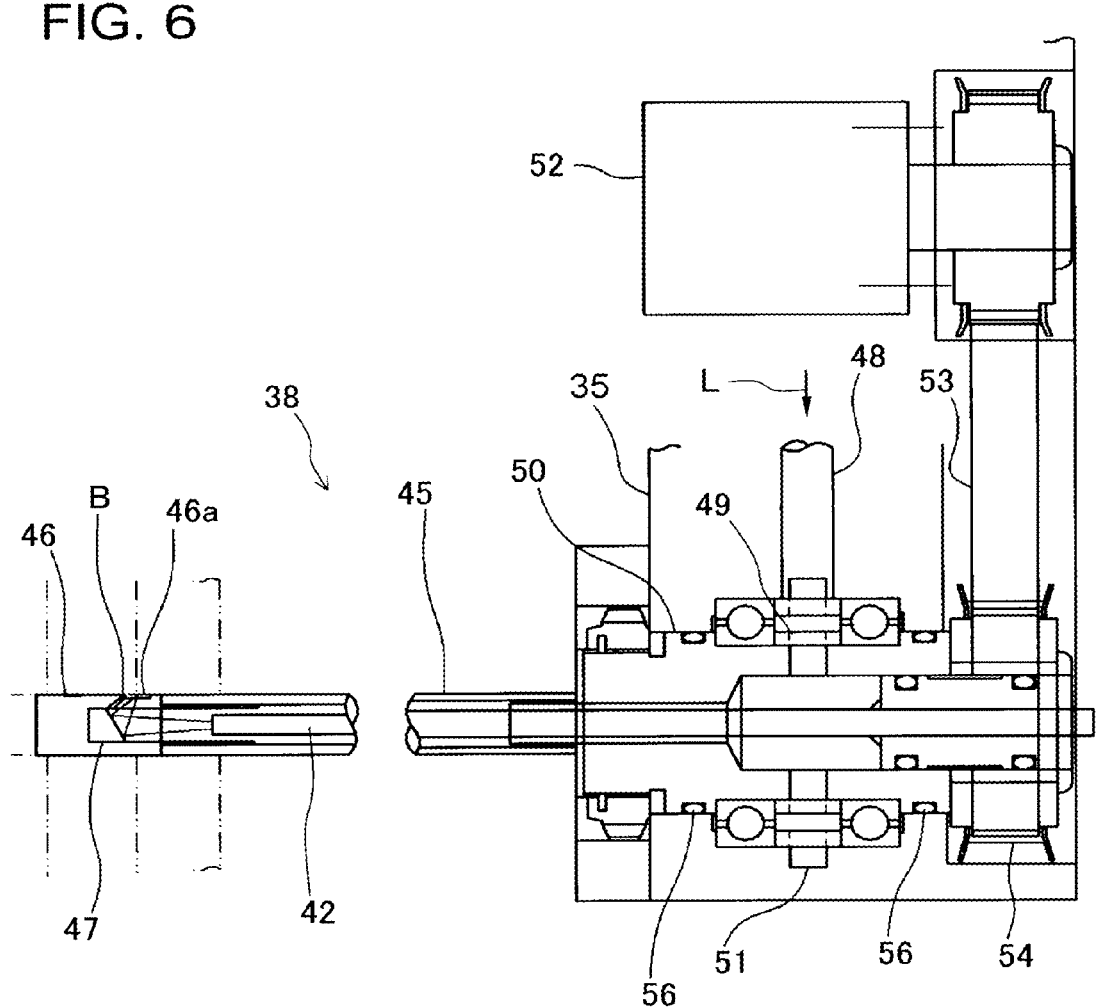
FIG. 6 is a cross-sectional view of a main part partially illustrating the structure of the laser peening device illustrated in FIG. 5.

Next, an example of this operating unit 29 will be described. FIG. 5 is a cross-sectional view for describing a general structure of a laser peening device 29 as the operating unit. FIG. 6 is a cross-sectional view of a main part partially illustrating the structure of the laser peening device 29.

The laser peening device 29 includes a laser oscillator 40, a laser light adjusting unit 41, an optical fiber 42, and a liquid feeding unit 43, besides the base 30, the rotor radial direction drive unit 31, the rotor tangential direction drive unit 32, the head feeding drive unit 33, the head rotation drive unit 34, the boom 35, and the head unit 36.

The operating head 38 includes a hollow tubular member 45, a head distal end part 46, a reflection mirror 47, and a support member 50.

The tubular member 45 is supported rotatably by the support member 50. The inside of the tubular member 45 is penetrated by the optical fiber 42, and liquid from a hose 48 is supplied to the head distal end part 46. The head distal end part 46 is formed in a circular shape, has an opening portion 46a in a circumferential face, and is formed integrally with the tubular member 45. The reflection mirror 47 is fixed in the head distal end part 46 in the vicinity of the opening portion 46a and on an optical axis of the optical fiber 42. This reflection mirror 47 is formed of an aspheric mirror, and bends incident laser light B in a circumferential direction and concentrates the light in the vicinity of the inner face of the pin hole 15.

As the laser oscillator 40, a giant-pulse YAG laser oscillator is desirable. However, a laser oscillator capable of generating energy such as plasma when emitting pulse laser will suffice.

The laser light adjusting unit 41 adjusts the shape of the laser light B emitted from the laser oscillator 40 by a combination of a mirror, a lens, a baffle, and the like.

The optical fiber 42 transmits the laser light B whose shape is adjusted by the laser light adjusting unit 41 and emits the laser light to the inner face of the pin hole 15 as the target of operation. This optical fiber 42 is inserted in the head unit 36, and the laser light B transmitted through the optical fiber 42 is emitted via the head distal end part 46 of the operating head 38.

The liquid feeding unit 43 has a hose 48 and a tubular sleeve 49, and supplies liquid L to the inner face of the pin hole 15 as the target of operation. This hose 48 is connected to the support member 50 disposed in the boom 35. A circumferential trench 51 is formed between the boom 35 and the support member 50. The sleeve 49 is provided inside the trench 51, and has plural through holes allowing the liquid to pass through. In addition, a member 56 is an O-ring provided between the boom 35 and the support member 50. The liquid L from the liquid feeding unit 43 is stored in the trench 51 via the hose 48, and then supplied to the inside of the support member 50 via the through holes of the sleeve 49. The liquid supplied to the inside of the support member 50 passes through the inside of the operating head 38 and is jetted via the opening 46a of the head distal end part 46 to the inner face of the pin hole 15.

The liquid L supplied from the hose 48 passes through the tubular member 45 and is jetted via the opening portion 46a of the rotating head distal end part 46, thereby being supplied to the entire inner face of the pin hole 15. The supplied liquid L drops to a liquid receiving pan 55 provided below the rotor 1 and is accumulated therein (see FIG. 2).

Using water for example as the liquid to be supplied thus from the liquid feeding unit 43 allows to emit the laser light B while washing the vicinity of the pin hole 15 as the target of operation. Further, instead of neutral liquid like the water, using alkaline liquid such as ionized alkaline water or ammonia water as the liquid supplied from the liquid feeding unit 43 can prevent the turbine rotor blade 10 and the disk 12 from rusting.

Further, this liquid prevents attenuation of the laser light due to that impurities occurring during laser peening float in the optical path of the laser light B, and hence has the role of constantly filling this optical path with matter in a fresh condition without impurities.

The head rotation drive unit 34 has a rotary drive motor 52, a timing belt 53, and a pulley 54 as illustrated in FIG. 6, and the rotary drive motor 52, the timing belt 53, and the pulley 54 are disposed in the boom 35. The rotary drive motor 52 is drive controlled from the outside. The pulley 54 rotates the support member 50. The rotation moment of this rotary drive motor 52 is transmitted to the tubular member 45 via the timing belt 53 and the pulley 54, thereby rotating the tubular member 45 and the head distal end part 46.

Thus, the laser light B emitted from the distal end of the optical fiber 42 is reflected on the rotating reflection mirror 47, and is focused on the inner face of the pin hole 15. Consequently, it is possible to perform laser peening on the entire inner face of the pin hole 15, to thereby form a compressive stress region C therein.

In addition, in the laser peening device 29 illustrated in FIG. 6, when diameters of the pin holes 15 are different, it is possible that the operating head 38 does not contact the pin hole 15. The laser light B exhibits the highest stress improvement effect at a position with a minimum spot diameter, and the range in which a laser focus tolerance, that is, a stress improvement effect is obtained can be calculated in advance.

Further, when the diameter of the pin hole after the reamer processing is grasped in advance, it is possible to judge whether the operating head 38 is usable or not. When the diameter of the pin hole 15 is beyond the range in which the stress improvement effect can be obtained, the operating head 38 needs to be replaced.

However, the operating head 38 is difficult to be handled since it is formed of optical precision components, and it is difficult to simply replace only the operating head 38.

Accordingly, in this embodiment, the operating head 38, the optical fiber 42, the support member 50, the rotary drive motor 52, the timing belt 53, and the pulley 54 illustrated in FIG. 6 are formed in one unit, and replacement of the operating head 38 is possible by this unit.

Thus, in this embodiment, the operating head is structured in a unit together with the drive system. Accordingly, when the diameter of the pin hole is beyond the range in which the stress improvement effect can be obtained, the unit having the attached operating head can be simply replaced with a unit having an operating head by which the stress improvement effect can be obtained.

Figure 7:
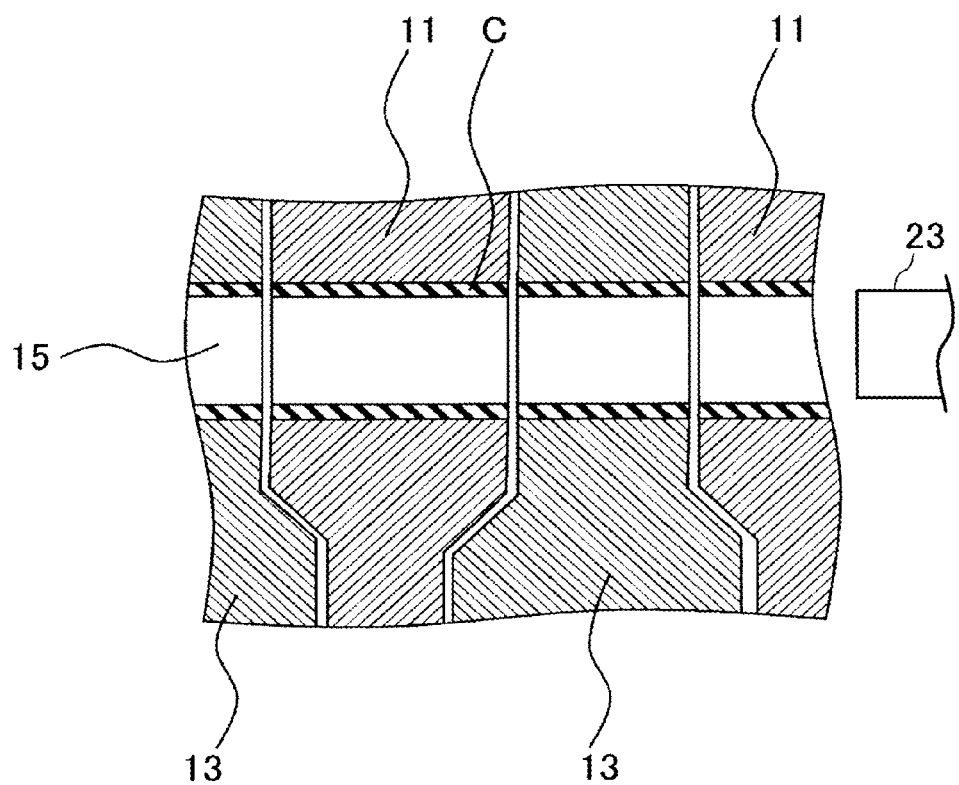
FIG. 7 is an enlarged cross-sectional view of a main part illustrating the coupling structure of the turbine rotor blade and the disk in which a pin is not inserted.

FIG. 7 is an enlarged cross-sectional view of a main part illustrating the coupling structure of the turbine rotor blade 10 and the disk 12 in which the pin 23 is not inserted. Here, the compressive stress region C is formed in the inner faces of the pin holes 15 of the blade fork 11 and the disk fork 13. This compressive stress region C is given in the range of about 0.1 mm to about 0.2 mm from a surface layer for example. The pin 23 can be inserted in this pin hole 15 to couple the turbine rotor blade 10 and the disk 12. By this compressive stress region C formed in the inner face of the pin hole 15, tensile stress acting on the inner face of the pin hole 15 during operation of the turbine is suppressed. Consequently, fatigue strength is enhanced, and occurrence of SCC can be suppressed.

Figure 8:
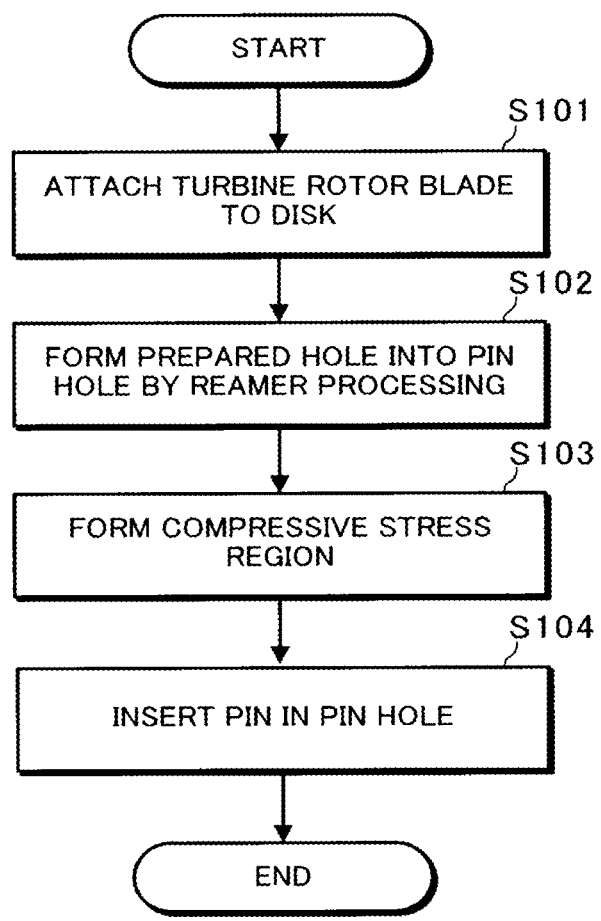
FIG. 8 is a flowchart illustrating one embodiment of a stress improvement treatment procedure of a steam turbine.

Next, an assembly procedure of the turbine rotor blade 10 and the disk 12 including formation of the compressive stress region C will be described. FIG. 8 is a flowchart illustrating one embodiment of a stress improvement treatment procedure of the steam turbine.

First, the blade fork 11 of the turbine rotor blade 10 and the disk fork 13 of the disk 12 are engaged to attach the turbine rotor blade 10 to the rotor 1 (step S101). At this point, the prepared hole 16 having a smaller diameter than the pin hole 15 is formed in the blade fork 11. In addition, in the disk fork 13, the prepared hole 16 is formed in the case of a newly provided turbine or the pin hole 15 is formed in the case of replacing the turbine rotor blade 10. In this case of replacement of the turbine rotor blade 10, the diameter of the pin hole is made larger than the turbine rotor blade 10 before replacement, and thus the pin hole formed in the disk fork 13 is practically the prepared hole 16.

Next, the reamer processing is performed on the prepared hole 16 to increase its diameter so as to form the pin hole 15, and chips formed in the reamer processing are removed as necessary (step S102).

Next, the stress improvement treatment by the laser peening device is performed on the surface of the pin hole 15 formed, so as to form the compressive stress region C (step S103). In addition, depending on an operation of the stress improvement treatment, this operation of removing chips can be carried out in parallel with or after the operation of the stress improvement treatment. For example, this laser peening is performed while liquid is supplied to the target of operation which is in the vicinity of an irradiation point of the laser light, and thus it can be performed while removing chips around the target of operation.

Finally, the pin is inserted in the pin hole 15, thereby coupling the turbine rotor blade 10 to the disk 12 (step S104). In addition, this assembly procedure can be performed automatically by control operation of the control unit 18.

Thus, in the stress treatment device and operating system according to this embodiment, by the compressive stress region C formed in the inner face of the pin hole, tensile stress acting on the inner face of the pin hole 15 can be suppressed during operation of the turbine. Consequently, occurrence of stress-corrosion cracking in the inner face of the pin hole formed in the structure, that is, the inner face of the pin hole of the coupling portion of the rotor blade and the disk of the steam turbine, can be decreased, and fatigue strength can be improved.

Further, in a steam turbine in an operating plant, contaminated steam from an atomic reactor circulates to the turbine, and thus it is an environment where there is a high radiation dose and a worker cannot perform a field operation for a long time. However, in the stress treatment device according to this embodiment, positioning of the operating head and remote control of operation are possible, and thus a control board and the like can be disposed at a position separated from a radiation source. Consequently, exposure and contamination are reduced, and a continuous operation of forming the compressive stress region is possible.

Embodiment 2

FIG. 9 is a view for describing the structure of a stress treatment device 24 according to embodiment 2, and is a front view illustrating the case of performing stress improvement on the pin hole 15 of the disk 12. The structure of the stress treatment device 24 of this embodiment 2 is similar to the stress treatment device illustrated in FIG. 2, and thus the detailed description is omitted.

In this stress treatment device 24, at the position where the turbine rotor blade 10 is removed, a guide plate 59 having the same shape as the blade fork 11 is disposed. These disk fork 13 and guide plate 59 are positioned by the temporary pin, and thereafter the peening is performed on the inner face of the pin hole 15, so as to form the compressive stress region C. In addition, the positioning of the pin hole 15 and the operating head 38 is similar to that of the stress treatment device of embodiment 1, and thus the description thereof is omitted here.

Thus, in the stress treatment device according to this embodiment 2, by the compressive stress region formed in the inner face of the pin hole of the disk fork, tensile stress acting on the inner face of the pin hole during operation of the turbine is suppressed. Consequently, occurrence of stress-corrosion cracking in the inner face of the pin hole of the coupling portion of the rotor blade and the disk of the steam turbine is prevented, and fatigue strength can be improved.

Further, the guide plate having the same shape as the blade fork is disposed at the position where the turbine rotor blade is removed. Accordingly, when the operating head passes between disk forks, the center axes thereof will not be displaced, and when the operation is carried out by laser peening, the liquid can be securely supplied to the inner face of the pin hole.

Embodiment 3

Figures 10A, 10B:
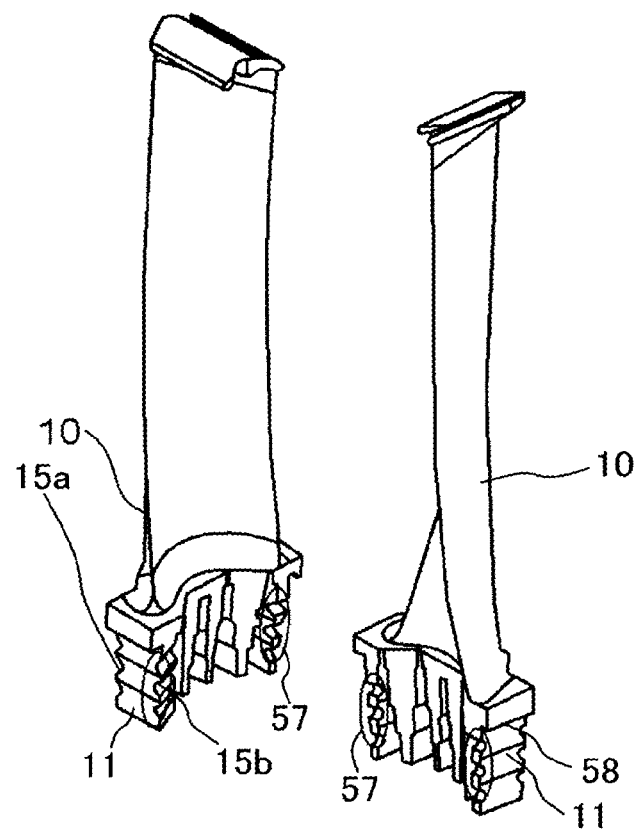
FIG. 10A is a perspective view of a turbine rotor blade in the case of treating a single part.
FIG. 10B is a perspective view of the turbine rotor blade in the case of treating a single part.
Figure 10C:
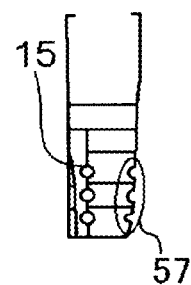
FIG. 10C is a partial side view of the turbine rotor blade from an x direction in the case of treating a single part.
Figure 11:
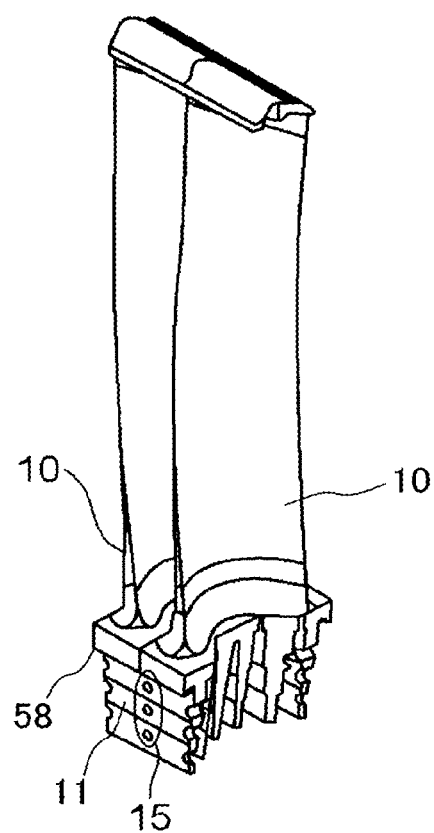
FIG. 11 is a perspective view illustrating turbine rotor blades in the case of treating two overlapped parts.
Figure 12:
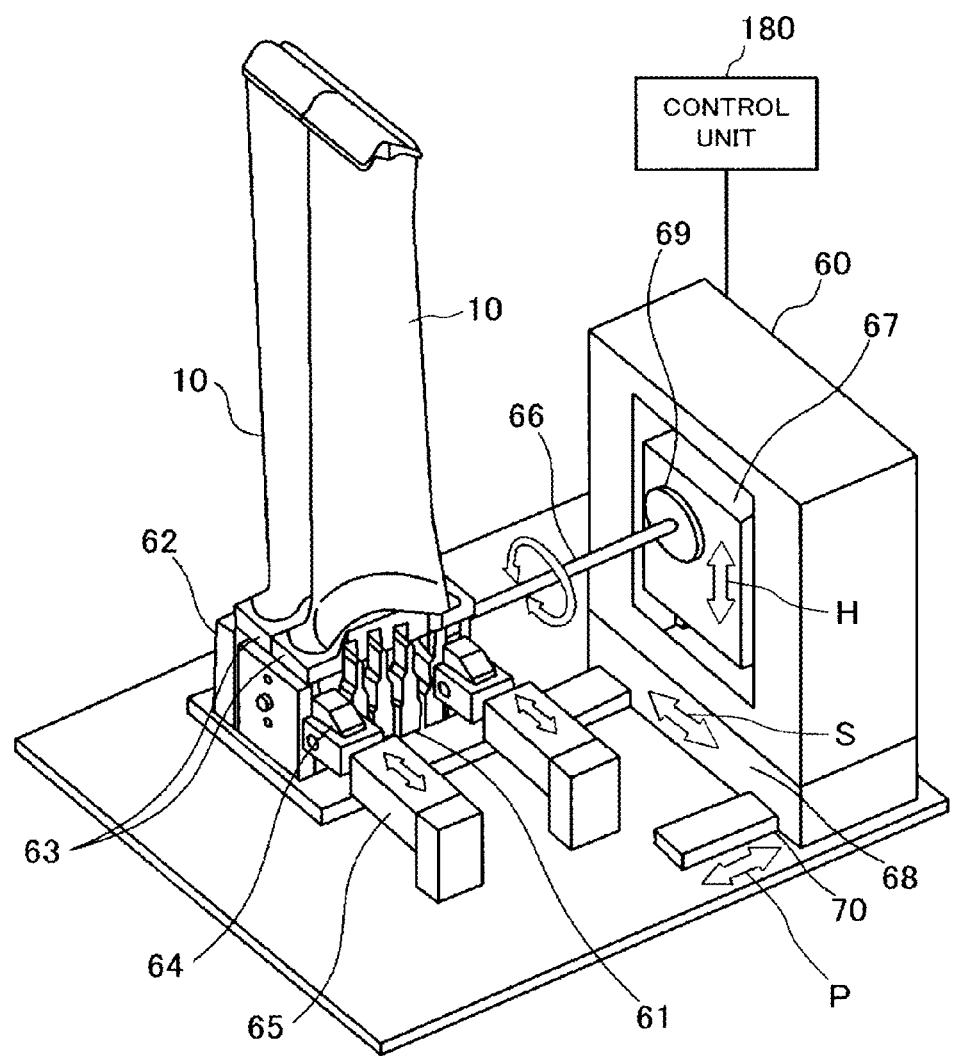
FIG. 12 is a perspective view illustrating a stress treatment device according to Embodiment 3.

Next, the case of performing peening on the turbine rotor blade 10 removed from the rotor 1 will be described. FIG. 10A to FIG. 10C are views illustrating a turbine rotor blade 10 in the case of treating a single part. FIG. 10A and FIG. 10B are perspective views of the turbine rotor blade, and FIG. 10C is a partial side view from an x direction. FIG. 11 is a perspective view illustrating turbine rotor blades 10 in the case of treating two overlapped parts. FIG. 12 is a view for describing the structure of a stress treatment device 60 according to embodiment 3, and is a perspective view illustrating the stress treatment device 60 performing stress improvement on the inner face of pin holes 15 of removed turbine rotor blades 10.

The turbine rotor blades 10 have semicircular holes 15a, 15b in a width direction. The holes 15a, 15b are formed three each in the radial direction of the rotor 1, and form a radical face 57. Then, by overlapping the adjacent turbine rotor blades 10 with each other, pin holes 15 are formed by each other's holes 15a, 15b.

In FIG. 10A and FIG. 10B, treatment on the semicircular holes 15a, 15b needs to be performed two times on left and right. However, in FIG. 11, by the adjacent turbine rotor blades 10 disposed so that the pin holes 15 are on the same axis, the left and right holes 15a, 15b can be treated at the same time. Consequently, the number of operations can be reduced by one each time.

In the stress treatment device 60 according to this embodiment 3, the pin holes 15 of adjacent turbine rotor blades 10 are positioned on the same axis and treated. For this positioning, the stress treatment device 60 has a guide plate 61, a radical face block 62, an end block 63, and a clamp 64. The guide plate 61 is formed in the same fork shape as the disk fork 13, and is engaged with the blade fork 11 of the turbine rotor blade 10. The radical face block 62 receives one face (for example, a face on the hole 15a side) of the radical face 57 of the blade fork 11. The end block 63 engages with an implanted part end 58 of the blade fork 11. The clamp 64 has a projecting part having a semicircular shape inverse to the radical face 57, and this projecting part engages with a hole on the other face of the radical face 57 (for example, the hole 15b).

Specifically, the blade fork 11 is inserted in the guide plate 61, and simultaneously pressed against the radical face block 62 and the end block 63. As a result, the blade fork 11 is bound in three directions: two directions corresponding to a circumferential direction and an axial direction of the rotor and a longitudinal direction of the turbine rotor blade 10. In this bound state, the clamp 64 abuts one face (for example, a face on the hole 15a side) of the radical face 57 of the blade fork 11 by an air cylinder 65, allowing to always fix the turbine rotor blade 10 at the same position. The guide plate 61, the radical face block 62, the end block 63, and the clamp 64 function as "a positioning unit which positions the removed turbine rotor blade in three directions: two directions corresponding to a circumferential direction and an axial direction of the rotor at the time of assembly and a longitudinal direction of the turbine rotor blade".

Further, the stress treatment device 60 has a head unit 66, a height direction adjusting unit 67, a width direction adjusting unit 68, a head rotating unit 69, a head feeding unit 70, and a control unit 180. The head unit 66 has a structure similar to that of the head unit 36 of embodiment 1, and thus the detailed description thereof is omitted here. The height direction adjusting unit 67 adjusts a height direction H of the head unit 66. The width direction adjusting unit 68 adjusts a width direction S of the head unit 66. The head rotating unit 69 rotates the head unit 66. The head feeding unit 70 moves the head unit 66 in a direction P parallel with the direction corresponding to the center axis 27 of the rotor 1.

The control unit 180 drive controls the height direction adjusting unit 67, the width direction adjusting unit 68, the head rotating unit 69, and the head feeding unit 70 simultaneously to treat the inner face of the pin hole 15, so as to form the compressive stress region. The turbine rotor blade 10 in which this compressive stress region is formed is assembled sequentially with the disk 12 of the rotor 1.

Thus, in the stress treatment device according to this embodiment, since the compressive stress region C is formed in the inner face of the pin hole of the turbine rotor blade, tensile stress acting on the inner face of the pin hole 15 during operation of the turbine is suppressed. Consequently, occurrence of stress-corrosion cracking in the inner face of the pin hole of the coupling portion of the rotor blade and the disk of the steam turbine is prevented, and fatigue strength can be improved.

Embodiment 4

Figure 13:
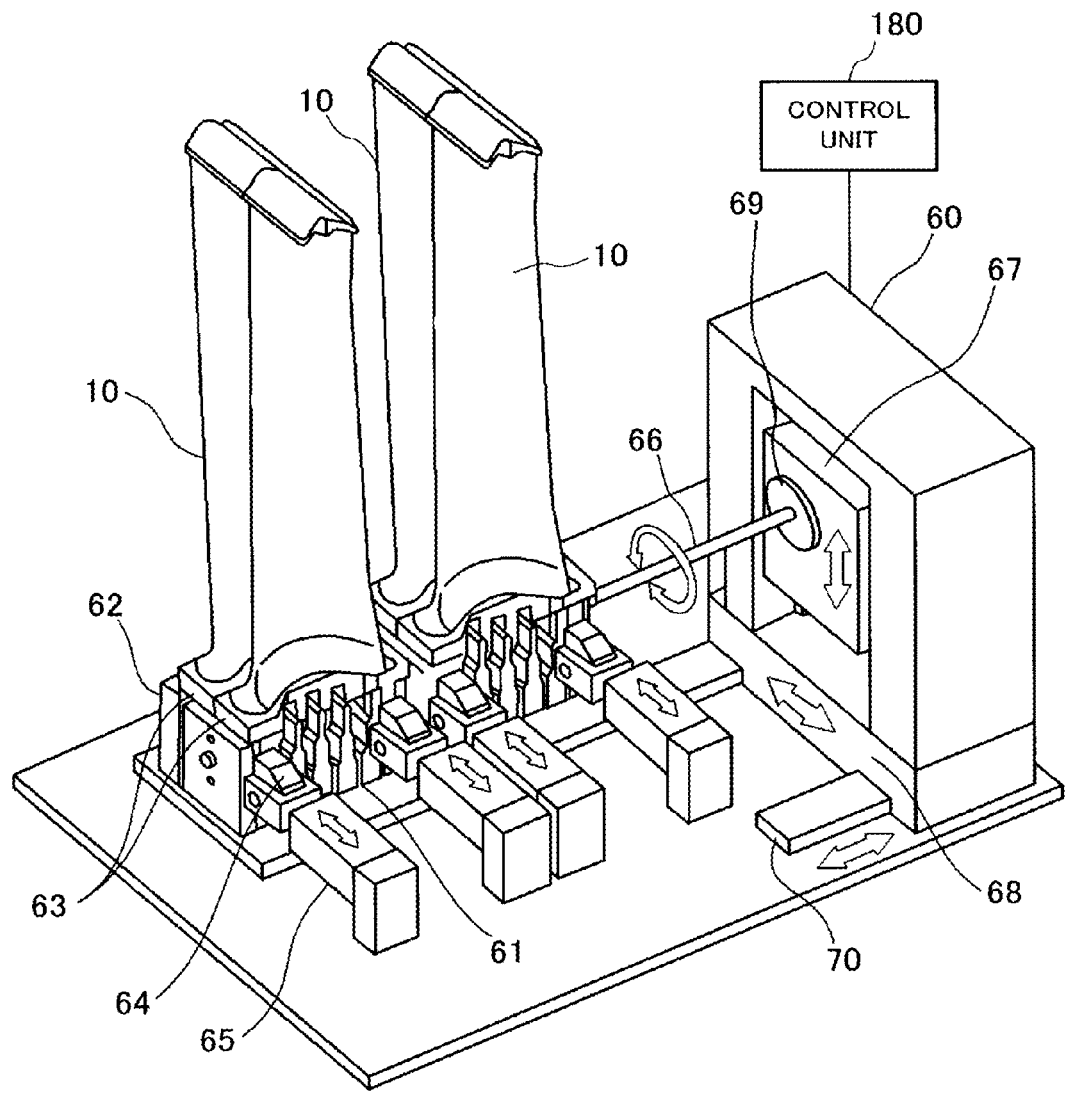
FIG. 13 is a perspective view illustrating a stress treatment device according to Embodiment 4.

FIG. 13 is a perspective view illustrating the structure of a stress treatment device 60 according to embodiment 4. This stress treatment device 60 is an application of the stress treatment device of embodiment 3, in which two rows of adjacent turbine rotor blades 10 are disposed, and pin holes 15 of these turbine rotor blades 10 are positioned on the same axis and treated. Accordingly, the stress treatment device 60 has two each of guide plates 61, radical face blocks 62, end blocks 63, and clamps 64. Further, the head unit 66 needs to be longer than the head unit of embodiment 3 corresponding to the two rows of turbine rotor blades 10. Note that although two rows of turbine rotor blades are treated simultaneously in this embodiment, this is not restrictive, and it is possible to treat three or more rows of turbine rotor blades simultaneously.

Thus, the stress treatment device according to this embodiment exhibits similar effects as those of embodiment 3, and is capable of treating plural rows of turbine rotor blades simultaneously. Consequently, the operating time can be shortened.

Embodiment 5

Figure 14A:
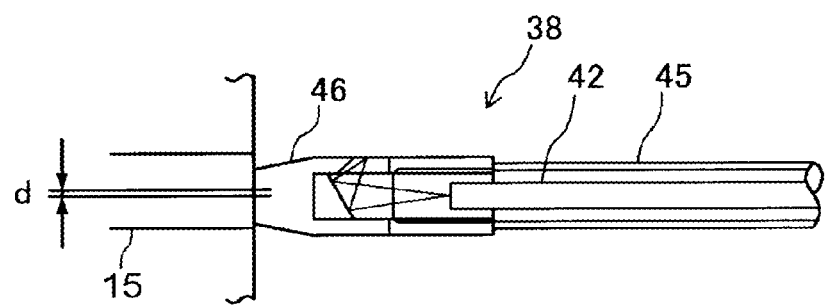
FIG. 14A is an enlarged cross-sectional view of an entrance part of a pin hole.
Figure 14B:
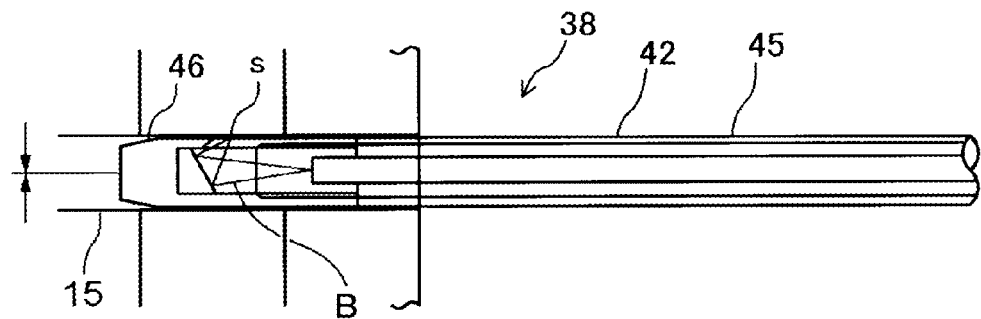
FIG. 14B is an enlarged cross-sectional view of an exit part of the pin hole.

FIG. 14A and FIG. 14B are cross-sectional views of an operating head 38 of a stress treatment device according to embodiment 5. FIG. 14A is a view illustrating the operating head 38 in a spindle shape to be inserted in a pin hole 15, and FIG. 14B is a view illustrating the operating head 38 in the spindle shape being inserted in the pin hole 15.

In embodiment 1, the image measurement program is used to position the operating head from the taken image. In this case, even when the head distal end part 46 has a columnar shape, the operating head 38 can be positioned easily at the position of the pin hole 15 without being interfered at the entrance of the pin hole 15. However, there may be a case where this taken image is displayed on a monitor, and a positional displacement of the operating head needs to be corrected manually. In this case, a slight positional displacement cannot be corrected, and the head distal end part 46 can be interfered at the entrance of the pin hole 15.

Accordingly, the operating head 38 according to this embodiment has a head distal end part 46 formed in a spindle shape. When the operating head 38 in which this head distal end part 46 is disposed is to be positioned and inserted in the pin hole 15, even when a slight positional displacement occurs, the operating head 38 receives force in a radial direction of the pin hole 15. By this reaction force the tubular member 45 bends, and the operating head 38 is aligned along the pin hole 15. This operating head 38 is formed smaller in diameter than the pin hole 15 by about 0.5 mm in advance, and hence is capable of absorbing an axial center displacement d of about 0.25 mm in the radial direction.

Further, when stress improvement is performed on the inner face of the pin hole 15 by laser peening, the laser light B focused with a minimum spot diameter s provides largest energy and has a tolerance of about ±0.5 mm with respect to the diameter of the pin hole 15 by which a stress improvement can be expected. Accordingly, it becomes possible to transmit rotary motive power in a range that the stress improvement effect is obtained while absorbing a slight positional displacement (axial displacement d).

Embodiment 6

Figure 15A:
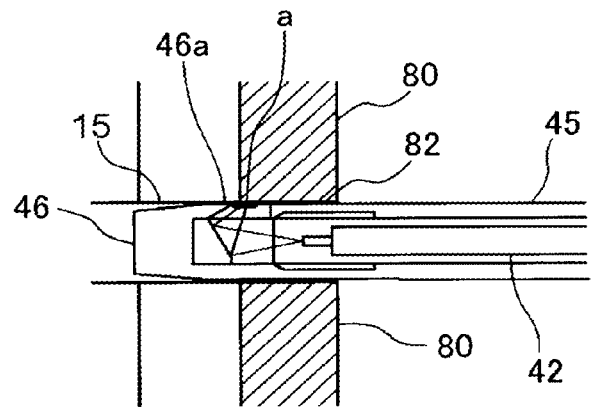
FIG. 15A is an enlarged cross-sectional view of an entrance part of a pin hole.
Figure 15B:
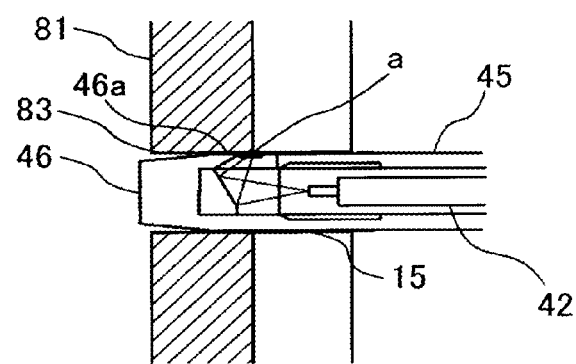
FIG. 15B is an enlarged cross-sectional view of an exit part of the pin hole.

FIG. 15A and FIG. 15B are cross-sectional views of an entrance and exit part of a pin hole 15. FIG. 15A is a view illustrating the entrance part, and FIG. 15B is a view illustrating the exit part.

At the entrance part and the exit part of the pin hole 15, the opening portion 46a is not completely inserted in the pin hole 15, and thus liquid is not jetted only to an operating target position a but is diverted. As a result, the amount of liquid to be supplied to the operating target position a decreases.

Accordingly, in this embodiment, guide plates 80, 81 are disposed closely to the entrance part and the exit part of the pin hole 15. The guide plates 80, 81 have through holes 82, 83 having the same diameter as the pin hole 15 and are disposed so that the center axes of the through holes 82, 83 are coaxial with the center axis of the pin hole 15.

In this state, the head distal end part 46 is inserted in the guide plate 80. When the opening portion 46a reaches the position of the entrance part of the pin hole 15, liquid is supplied to the pin hole 15 and the through hole 82 and is jetted directly to the entrance part of the pin hole 15 without being diverted.

Then, the head distal end part 46 proceeds in the pin hole 15. When the opening portion 46a reaches the exit part of the pin hole 15, liquid is supplied to the pin hole 15 and the through hole 83, and is jetted directly to the exit part of the pin hole 15 without being diverted.

Thus, in this embodiment, since the guide plates 80, 81 are disposed at the entrance part and the exit part of the pin hole 15, diversion of liquid can be prevented, and the liquid can be jetted to the entrance part and the exit part, thereby allowing effective cleaning.

Embodiment 7

Figure 16A:
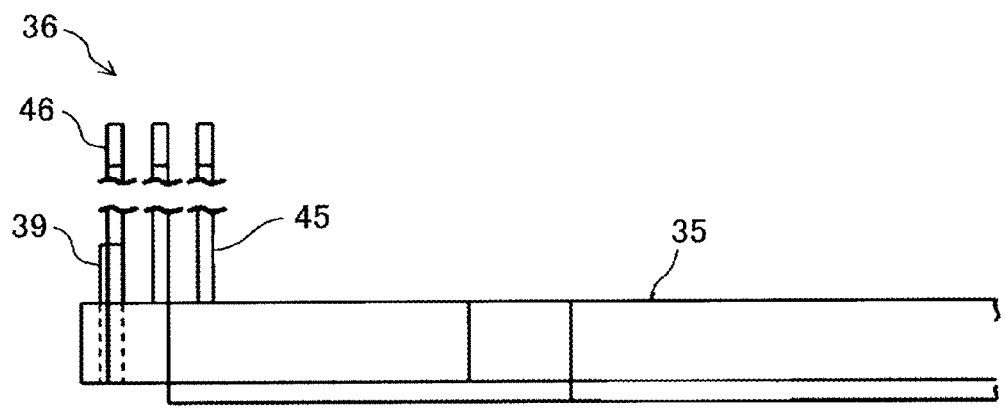
FIG. 16A is an enlarged side view of main parts of a head unit and a boom of a stress treatment device according to Embodiment 7.
Figure 16B:
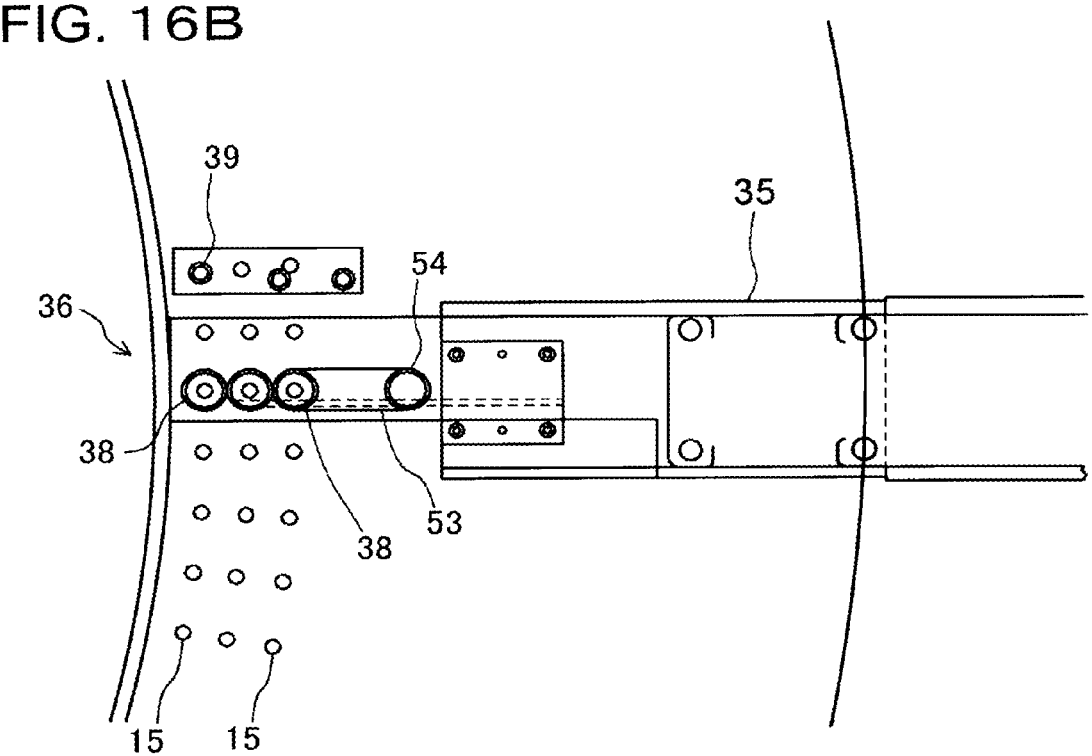
FIG. 16B is an enlarged front view of the main parts of the head unit and the boom of the stress treatment device according to Embodiment 7.

FIG. 16A and FIG. 16B are enlarged views of main parts of a head unit 36 and a boom 35 of a stress treatment device according to embodiment 7. FIG. 16A is a view illustrating a side face, and FIG. 16B is a view illustrating a front face. In this embodiment, the structure of the head unit 36 which simultaneously treats a plurality of pin holes 15 disposed in the radial direction of the rotor 1 will be described.

A plurality of pin holes 15 are formed at equal pitches in the radial direction of the rotor 1. Accordingly, corresponding to these pin holes 15, a plurality of operating heads 38 of the head unit 36 are disposed in a longitudinal direction of the boom 35 (see FIG. 16B). These operating heads 38 are rotated simultaneously by, for example, the head rotation drive unit 34 illustrated in FIG. 4, allowing simultaneous treatment of the plurality of pin holes 15.

Thus, in this embodiment, a plurality of pin holes disposed in the radial direction of the rotor can be treated simultaneously, and thus the number of times of positioning and the number of times of treatment can be reduced. Consequently, work processes and operating times of the treatment can be reduced.

Embodiment 8

Figure 17A:
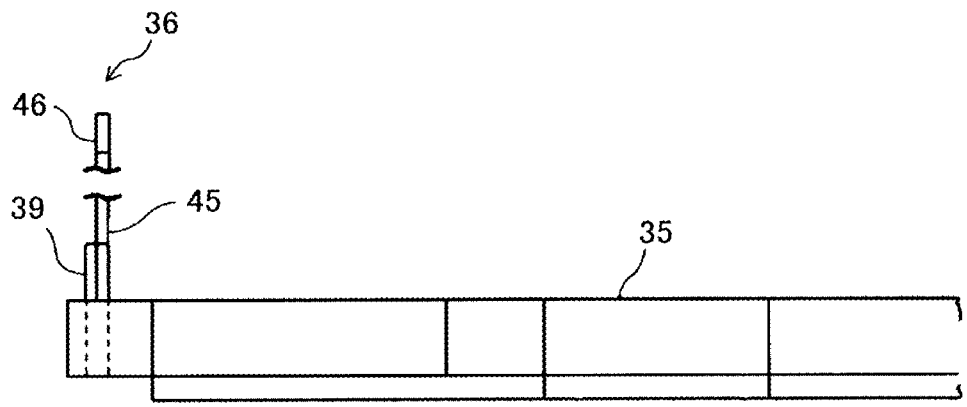
FIG. 17A is an enlarged side view of main parts of a head unit and a boom of a stress treatment device according to Embodiment 8.
Figure 17B:
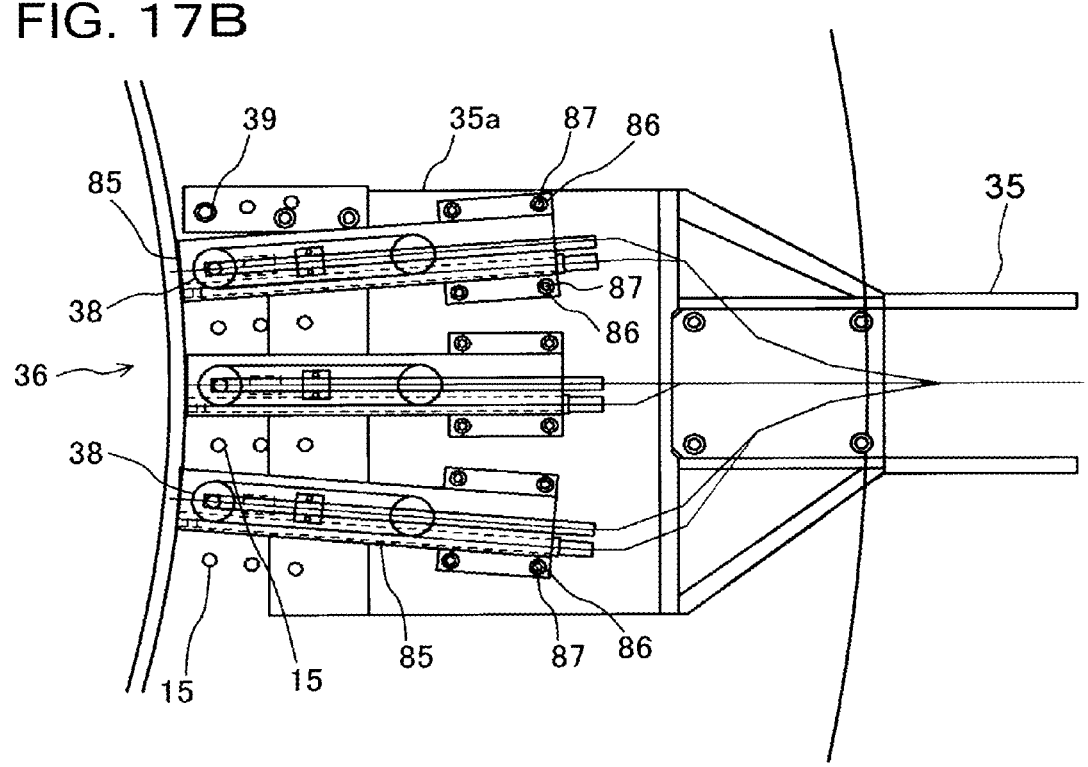
FIG. 17B is an enlarged front view of the main parts of the head unit and the boom of the stress treatment device according to Embodiment 8.

FIG. 17A and FIG. 17B are enlarged views of main parts of a head unit 36 and a boom 35 of a stress treatment device according to embodiment 8. FIG. 17A is a view illustrating a side face, and FIG. 17B is a view illustrating a front face. In this embodiment, the structure of the head unit 36 which simultaneously treats a plurality of pin holes 15 disposed in the circumferential direction of the rotor 1 will be described.

For example, as illustrated in FIG. 5, the blade fork 11 and the disk fork 13 become smaller in thickness toward their distal end, and the length of the pin holes 15 becomes shorter accompanying this. Accordingly, when a plurality of pin holes are treated simultaneously using the head unit of embodiment 7, a waiting time occurs in treatment of pin holes with a short length.

Further, a plurality of pin holes 15 are also formed at equal pitches in the circumferential direction of the rotor.

Accordingly, a plurality of operating heads 38 of the head unit 36 are disposed in a width direction of the boom 35 corresponding to these pin holes 15 (see FIG. 17B). These operating heads 38 are rotated simultaneously by the head rotation drive unit 34 illustrated in FIG. 4 for example, allowing simultaneous treatment of the plurality of pin holes 15.

The operating heads 38 are disposed respectively on support members 85 having a rod-shaped structure. The support members 85 are disposed in a broad area part (holder) 35a of the boom 35 having a battledore shape as illustrated in FIG. 17B. At this time, the support members 85 are disposed at predetermined angles so that the centers of the operating heads 38 are at equal pitches in the circumferential direction of the rotor corresponding to the pin holes 15.

Thus, in this embodiment, a plurality of pin holes disposed in the circumferential direction of the rotor can be treated simultaneously. Accordingly, the number of times of positioning and the number of times of treatment can be reduced. Consequently, work processes and operating times of the treatment can be reduced, waiting times of the treatment can be decreased, and the number of times of rotation operation of the head rotation Modification Example 1

Regarding arrangement positions of pin holes 15, various arrangements are conceivable depending on positions in the radial direction of the rotor 1 and pitches of pin holes 15 on the circumference. Thus, it is possible to respond to the case of an arrangement of different pin holes by replacing the attachment positions of the operating heads of the holder 35a illustrated in FIG. 17A and FIG. 17B corresponding to the rotor 1 used.

Accordingly, in this embodiment, reamer holes 86 of the holder 35a are processed in advance for positioning the support members 85 of the operating heads 38 at predetermined angles corresponding to the pitches on the circumference of the pin holes 15 as the target of operation. Thus, a plurality of holders 35a corresponding to different circumferential pitches of pin holes 15 as the target of operation are fabricated. Then, the holder 35a corresponding to the pitches of pin holes 15 as the target of operation is selected, the support members 85 are attached to this holder 35a, and reamer bolts 87 are inserted in the reamer holes 86, thereby positioning and fixing the support members 85.

Thus, in this modification example 1, a plurality of holders corresponding to different circumferential pitches of pin holes are fabricated, and the support members of the operating heads are attached to the holder corresponding to the pitches of pin holes as the target of operation out of these holders. Thus, treatment inside pin holes is possible for the arrangement of pin holes of any plant.

Modification Example 2

Further, in the same plant, the same number of pinholes 15 are arranged in a fork on circumferences of plural stages, for example, three pin holes are arranged in the same radial direction on each of three concentric circumferences with different radii in the embodiment.

Accordingly, in this modification example 2, a holder 35a in which the positions of the operating heads 38 can be rearranged is provided.

Figure 18A:
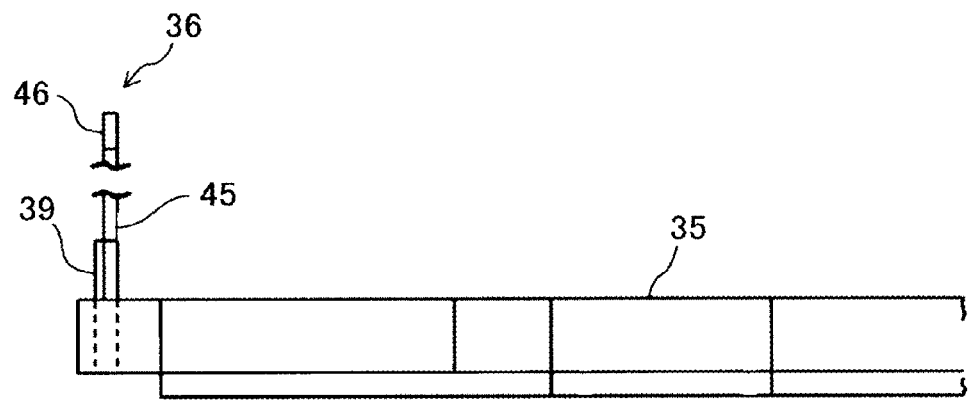
FIG. 18A is an enlarged side view of main parts of a head unit and a boom of a stress treatment device according to Modification Example 2 of Embodiment 8.
Figure 18B:
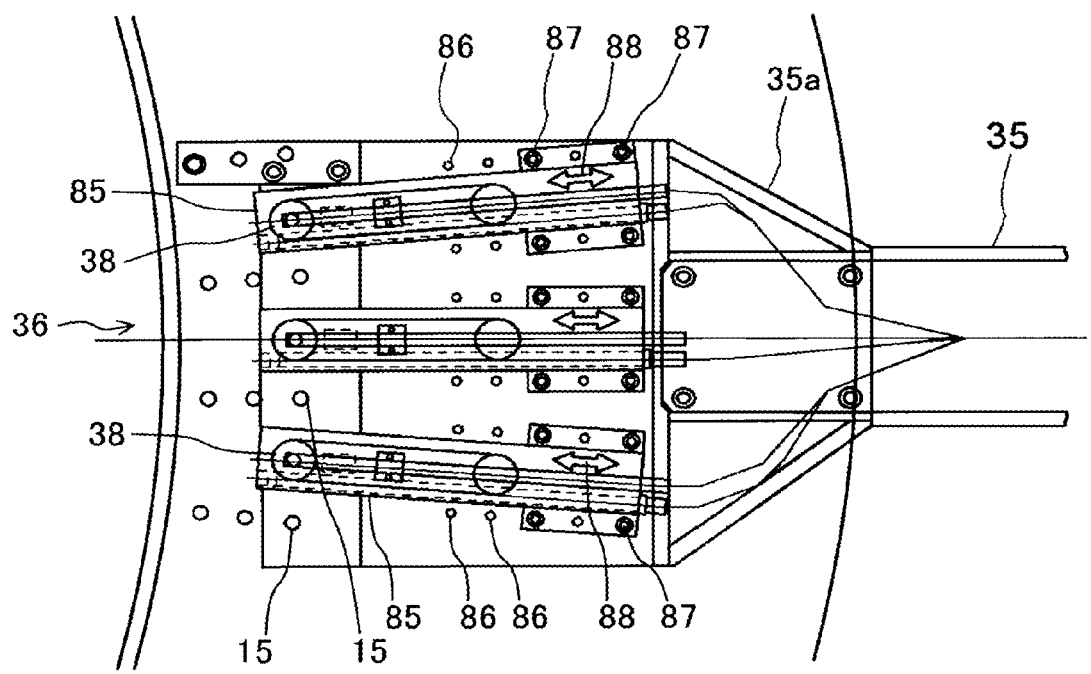
FIG. 18B is an enlarged front view of the main parts of the head unit and the boom of the stress treatment device according to Modification Example 2 of Embodiment 8.

FIG. 18A and FIG. 18B are enlarged views of main parts of a head unit 36 and a boom 35 of a stress treatment device according to modification example 2 of embodiment 8. FIG. 18A is a view illustrating a side face, and FIG. 18B is a view illustrating a front face.

The holder 35a has a plurality of reamer holes 86 for assembly arranged in parallel with a radial direction of a plurality of predetermined rotors 1. The reamer holes 86 for assembly are arranged along a longitudinal direction on both sides of one operating head 38. Then, each operating head 38 is moved in the radial direction of the rotor 1 (arrow 88 direction) to align the head with the positions of pin holes 15 as the target of operation, and reamer bolts 87 are inserted in the reamer holes 86 in this state, thereby positioning and fixing the support member 85.

Thus, in this modification example 2, the operating head is moved to be aligned with the positions of pin holes as the target of operation, and the support member is positioned in this state. Accordingly, the operating head can be easily rearranged to the positions of pin holes as the target of operation.

Embodiment 9

Figure 19A:
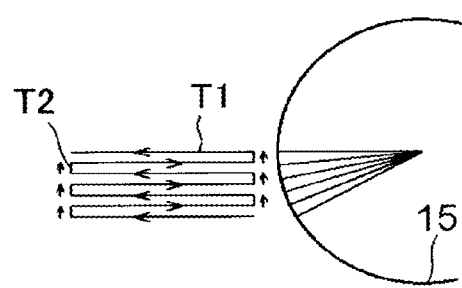
FIG. 19A is a diagram illustrating an operating path in the case where an operating action of a stress treatment device according to Embodiment 9 is a straight action.
Figure 19B:
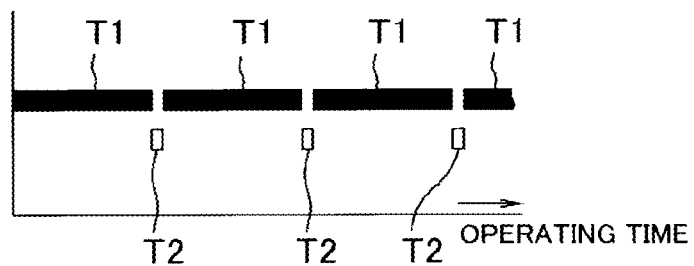
FIG. 19B is a diagram illustrating an operating time in the case where the operating action of the stress treatment device according to Embodiment 9 is the straight action.

FIG. 19A and FIG. 19B are diagrams for describing an operating action of a stress treatment device according to embodiment 9. FIG. 19A is a diagram illustrating an operating path in the case of a straight action, and FIG. 19B is a diagram illustrating an operating time in the case of the straight action.

The stress treatment device 24 (or 60) drive controls the head feeding drive unit 33 first to irradiate the pin hole 15 with laser straight in an axial direction thereof (direction from right to left in the view) for a laser irradiation time T1. Thereafter, the head rotation drive unit 34 is drive controlled to block the laser light for a laser blocking time T2, and move the optical axis in a circumferential direction of the pin hole 15. Then, the head feeding drive unit 33 is drive controlled again to irradiate the pin hole with laser straight in an axial direction thereof (direction from left to right in the view) for the laser irradiation time T1. Thereafter, this operating action is repeated, and thereby the compressive stress region is formed in the inner face of the pin hole 15.

Here, the laser irradiation time T1 is a value obtained by dividing the length in the axial direction of the pin hole 15 by a moving speed of the laser light. The laser blocking time T2 is, for example, a value related to the aperture of the laser light, by which the compressive stress region can be formed with a predetermined thickness without unevenness in the inner face of the pin hole 15.

Thus, in this embodiment, the laser light is moved in parallel with the axial direction of the pin hole and is also moved repeatedly from left to right, and thus an even compressive stress region can be formed in the inner face of a pin hole.

Modification Example

Figure 20A:
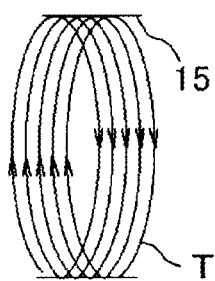
FIG. 20A is a diagram illustrating an operating path in the case where the operating action of a stress treatment device according to Embodiment 9 is a spiral action.
Figure 20B:
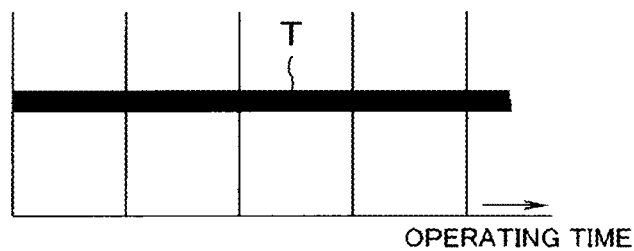
FIG. 20B is a diagram illustrating an operating time in the case where the operating action of the stress treatment device according to Embodiment 9 is the spiral action.

FIG. 20A and FIG. 20B are diagrams for describing an operating action of a stress treatment device according to a modification example of embodiment 9. FIG. 20A is a diagram illustrating an operating path in the case of a spiral action, and FIG. 20B is a diagram illustrating an operating time in the case of the spiral action.

In the operating action of embodiment 9, since the laser blocking time T2 occurs in every operation, it is conceivable that the operating time becomes longer by the repeated laser blocking time T2.

Accordingly, in this modification example, the case where laser irradiation is performed sequentially will be described.

The stress treatment device 24 (or 60) drive controls the head feeding drive unit 33 and the head rotation drive unit 34 to irradiate the inner face of the pin hole 15 with laser in a spiral form for a laser irradiation time T, to thereby form the compressive stress region in the inner face of the pin hole 15.

Here, the laser irradiation time T is a value obtained by dividing the length of spiral movement of the laser light from the entrance part to the exit part of the pin hole 15 at a predetermined pitch by a moving speed of the laser light. The predetermined pitch is, for example, a value related to the aperture of the laser light, by which the compressive stress region can be formed with a predetermined thickness without unevenness in the inner face of the pin hole 15.

Accordingly, in this modification example, since the laser irradiation is moved sequentially in the spiral form, the compressive stress region is formed evenly in the inner face of the pin hole, and the laser blocking time does not occur, allowing to shorten the operating time.

Embodiment 10

In the laser peening device 29, it is necessary to switch operating conditions to perform treatment depending on types of materials of the turbine rotor blade 10 and the disk 12.

Figure 21:
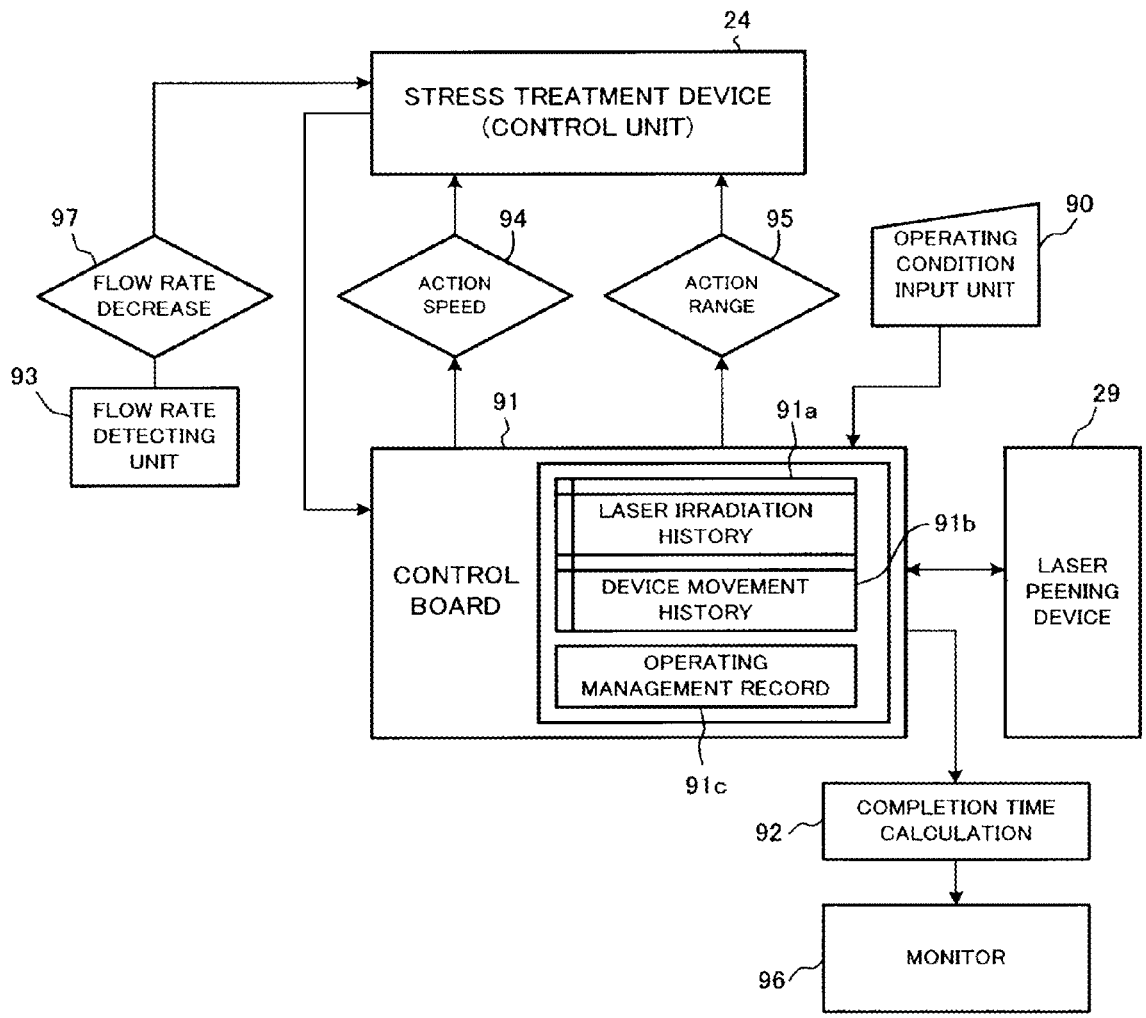
FIG. 21 is a block diagram illustrating the structure of an operating management system performing operating management of a stress treatment device.
Figure 22A:
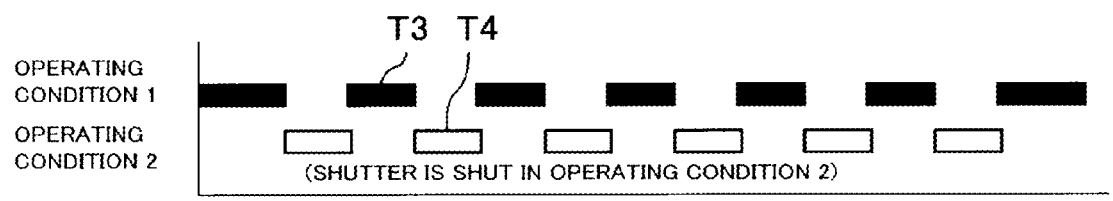
FIG. 22A is a diagram for describing the case where operating conditions are switched to perform treatment depending on types of materials in the stress treatment device performing laser peening, and for the case where only one material is treated.
Figure 22B:
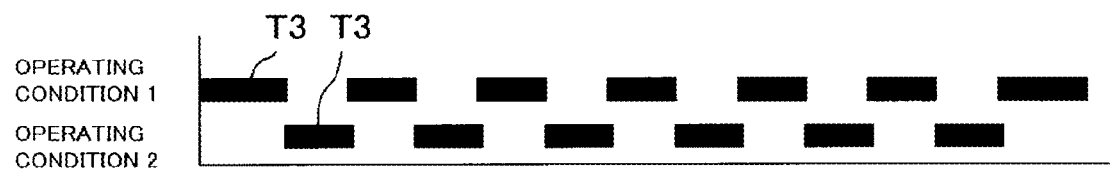
FIG. 22B is a diagram for describing the case where the operating conditions are switched to perform treatment depending on types of materials in the stress treatment device performing laser peening, and for the case where the treatment is performed under different conditions.

FIG. 21 is a block diagram illustrating the structure of an operating management system performing operating management of a stress treatment device 24. FIG. 22A and FIG. 22B are diagrams for describing the case where the operating conditions are switched to perform treatment depending on types of materials in the stress treatment device 24 performing laser peening. FIG. 22A is a diagram of the case where only one material is treated, and FIG. 22B is a diagram of the case where the treatment is performed under different conditions.

The operating management system includes the stress treatment device 24 including the laser peening device 29, an operating condition input unit 90, a control board 91, and a monitor 92.

With the operating condition input unit 90, information is input such as the amount of movement in the axial direction of the pin hole 15, whether to treat only one material (blade fork 11 or disk fork 13) illustrated in FIG. 22A and FIG. 22B, performing treatment under different operating conditions depending on types of materials, and the like as operating conditions.

The control board 91 obtains an action speed 94 of operation and an action range 95 based on the inputted information of operating conditions, outputs the information to the control unit 18 of the stress treatment device 24, and displays the information on the monitor 92. In addition, the operating condition input unit 90, the control board 91, and the monitor 92 can be structured of, for example, a personal computer (hereinafter referred to as a "PC"), or the like. That is, the operating condition input unit 90 corresponds to a keyboard and a mouse of a PC, the control board 91 corresponds to the main body of the PC, and the monitor 92 corresponds to a display of the PC.

The control unit 18 drive controls the rotor radial direction drive unit 31, the rotor tangential direction drive unit 32, the head feeding drive unit 33, and the head rotation drive unit 34 based on the inputted information, so as to treat the inner face of the pin hole 15.

The control board 91 detects a moving distance by the time from starting laser irradiation. The control board 91 outputs a laser stop instruction to the laser peening device 29 to block the laser light when a moving position in the axial direction of the pin hole 15 by the stress treatment device 24 reaches a target position (laser irradiation time T3).

Next, in FIG. 22A, laser irradiation is started when the position reaches the next start position of laser irradiation (laser blocking time T4) in a state that the laser light is blocked. Further, in FIG. 22B, the laser light is emitted immediately after the laser irradiating condition is switched, and the laser light is moved to the next target position (laser irradiation time T3).

Thus, in this embodiment, the condition of laser irradiation can be switched depending on the operating conditions, and thus the pin hole can be treated under different conditions depending on materials.

In addition, it is also possible to switch operating action conditions by inputting whether to perform treatment by the straight action or the spiral action illustrated in FIG. 19A and FIG. 20A as operating conditions from the operating condition input unit 90. In this case, the pin hole can be treated under different action conditions.

Embodiment 11

The case where the operating head 38 is used in common will be described when the diameters of pin holes 15 are different when stress improvement is performed on the pin holes 15 by laser peening. The operating head 38 illustrated in embodiment 1 is structured as a unit. However, in this structure, the replaced part is large, and possessing plural units is accompanied by a difficulty.

Accordingly, in this embodiment, use of the operating head 38 in common is made possible.

Figure 23A:
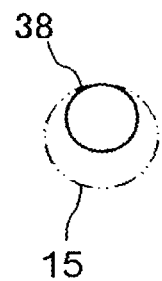
FIG. 23A is a cross-sectional view of a main part, illustrating a front face of an operating head of a stress treatment device according to Embodiment 11.
Figure 23B:
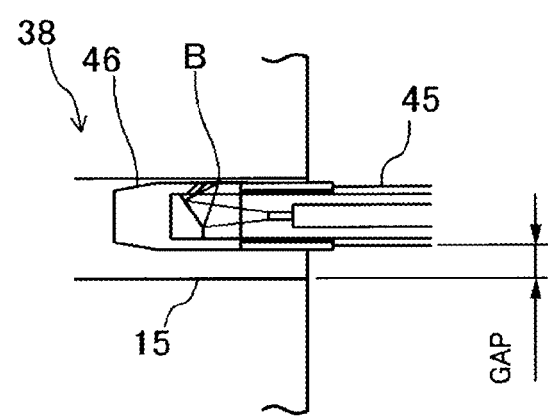
FIG. 23B is a cross-sectional view of a main part, illustrating a side face of the operating head of the stress treatment device according to Embodiment 11.
Figure 24:
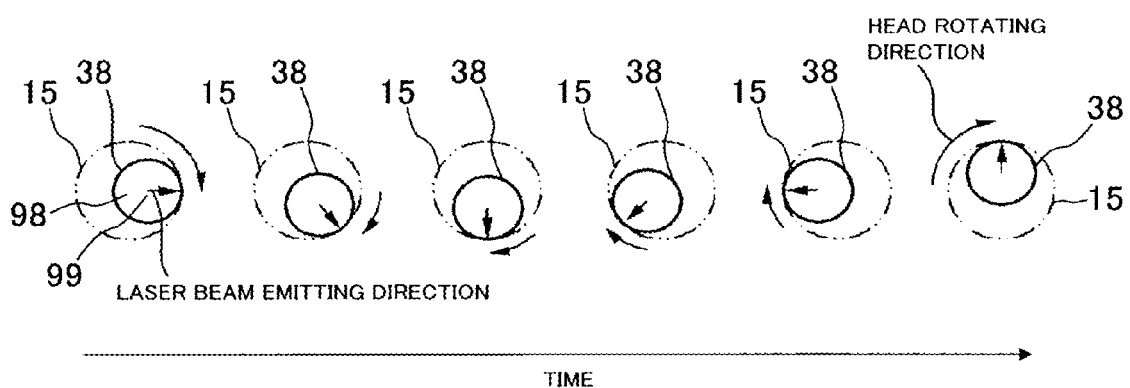
FIG. 24 is a front view for describing a rotation state of the operating head illustrated in FIG. 23A and FIG. 23B.

FIG. 23A and FIG. 23B are cross-sectional views of a main part of an operating head 38 of a stress treatment device according to embodiment 11. FIG. 23A is a view illustrating a front face, and FIG. 23B is a view illustrating a side face. FIG. 24 is a front view for describing a rotation state of the operating head 38 illustrated in FIG. 23A and FIG. 23B.

The diameter of the operating head 38 is formed to be smaller than the smallest diameter out of diameters of the pin holes 15 to be treated. The control unit 18 drive controls the rotor radial direction drive unit 31 and the rotor tangential direction drive unit 32 so that the operating head 38 moves in circle corresponding to the diameter of the pin hole 15 to be treated. At the same time, the control unit 18 drive controls the head rotation drive unit 34 in a normal direction coupling a center 98 of the operating head 38 and a center 99 of a pin hole 15. Thus, the operating head 38 can move eccentrically along the inner face of the pin hole 15. In this eccentric movement, the laser light B is controlled to be emitted constantly to a position where the operating head 38 contacts the pin hole 15.

Thus, in this embodiment, since the operating head moves eccentrically along the inner face of a pin hole corresponding to the diameter of the pin hole, it is possible to treat plural types of pin holes with different diameters.

Modification Example 1

Figure 25A:
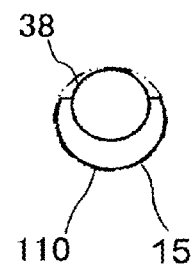
FIG. 25A is a cross-sectional view of a main part, illustrating a front face of an operating head of a stress treatment device according to Modification Example 1 of Embodiment 11.
Figure 25B:
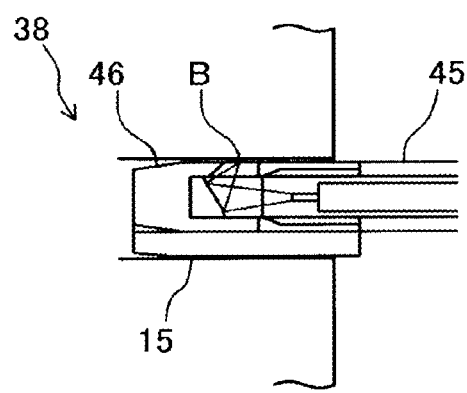
FIG. 25B is a cross-sectional view of the main part, illustrating a side face of the operating head of the stress treatment device according to Modification Example 1 of Embodiment 11.
Figure 26:
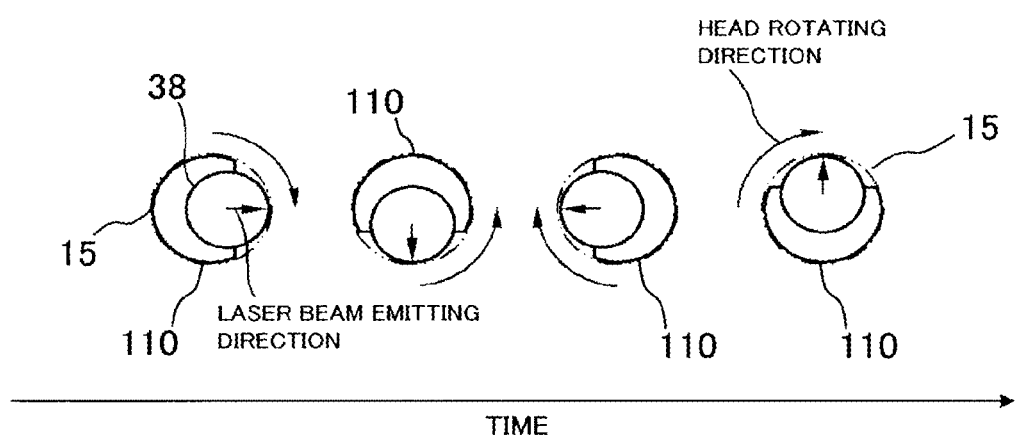
FIG. 26 is a front view for describing a rotation state of the operating head illustrated in FIG. 25A and FIG. 25B.

FIG. 25A and FIG. 25B are cross-sectional views of a main part of an operating head 38 of a stress treatment device according to modification example 1 of embodiment 11. FIG. 25A is a view illustrating a front face, and FIG. 25B is a view illustrating a side face. FIG. 26 is a front view for describing a rotation state of the operating head 38 illustrated in FIG. 25A and FIG. 25B.

In embodiment 11, a gap occurs between the pin hole 15 and the operating head 38. Accordingly, when vibration or shock is transmitted to the stress treatment device, the spot diameter of the laser light B increases to surpass the tolerance of a stress improvement range, and it is possible that the stress improvement effect is not obtained.

Accordingly, in this modification example, a spacer 110 corresponding to the gap between the pin hole 15 and the operating head 38 is provided to fill this gap. This spacer 110 is formed to have a crescent cross-sectional shape and attached removably to an outer peripheral face of the operating head 38 to adjust the gap with the pin hole 15. This spacer 110 can be fixed to the operating head by reamer bolts or the like for example. In addition, it is also possible to attach plural such spacers 110.

The control unit 18 drive controls the rotor radial direction drive unit 31, the rotor tangential direction drive unit 32, and the head rotation drive unit 34, similarly to embodiment 11. By attaching this spacer 110, the operating head 38 is able to favorably move eccentrically along the inner face of the pin hole 15. In this eccentric movement, the laser light B is controlled to be emitted constantly to a position where the operating head 38 contacts the pin hole 15.

Thus, in this modification example, the gap with the pin hole is adjusted by attaching the spacer to the operating head. Accordingly, the spacer having a shape corresponding to the diameter of the pin hole can be attached to the outer peripheral face of the operating head without replacing the operating head which is an optical part. Consequently, even a novice can easily attach the spacer.

Modification Example 2

Figure 27:
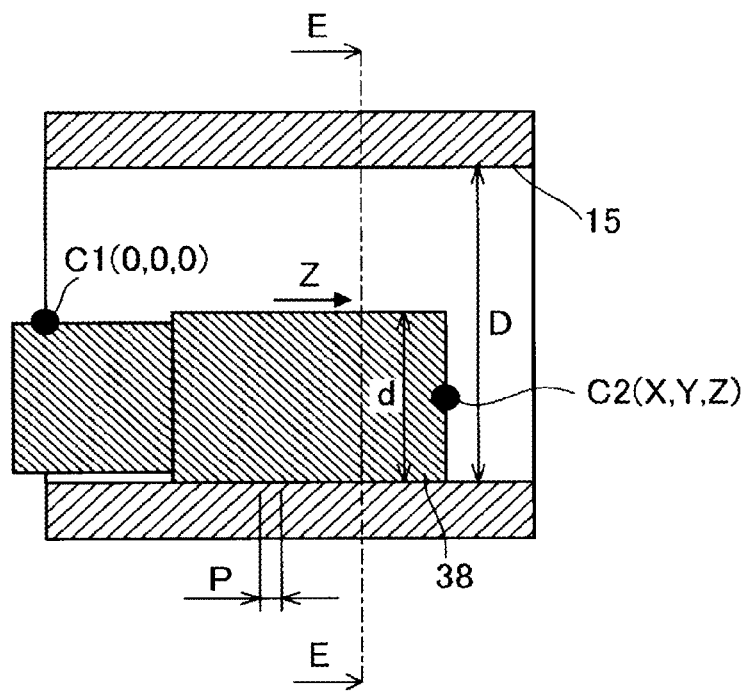
FIG. 27 is a cross-sectional view for describing operation control of an operating head of a stress treatment device according to Modification Example 2 of Embodiment 11.
Figure 28:
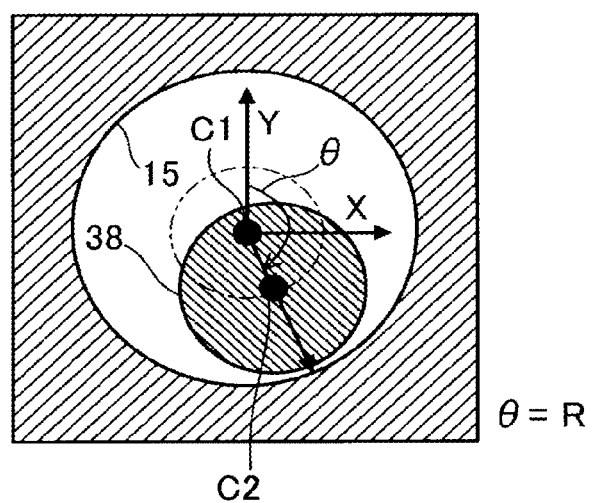
FIG. 28 is a cross-sectional view illustrating an E-E cross section of FIG. 27.

FIG. 27 is a cross-sectional view for describing operation control of an operating head 38 of a stress treatment device according to modification example 2 of embodiment 11. FIG. 28 is a cross-sectional view illustrating an E-E cross section of FIG. 27.

Here, the following relational expressions hold true.

$X = (D-d) \div 2 \times \cos\theta$ $Y = (D-d) \div 2 \times \sin\theta$ $Z = P \times N + P \times \theta \div 360$ C1: center position (reference position) of the pin hole 15 (reference coordinates (0, 0, 0))
C2: center position of the operating head (coordinates (X, Y, Z))
D: diameter of the pin hole 15
d: diameter of the operating head 38
$\theta$: orientation of the pin hole 15
P: feeding pitch of the operating head 38 per rotation
N: number of rotations of the operating head 38
X, Y, Z: distances in X, Y, Z axis directions from the center position C1 to the center position C2
R: angle of rotation axis of the head (angle in a clockwise direction with a position right above the pin hole center C1 being 0 degree)

From this relation, when the control unit 18 operation controls the operating head 38 in the aforementioned X, Y, Z axis directions and R angle direction, the operating head 38 (operating target position a) turns toward the normal direction coupling the center C1 of the pin hole 15 and the center C2 of the operating head 38, and the operating head 38 is able to eccentrically move along the inner peripheral face of the pin hole 15.

In addition, in movement of the center C2 of the operating head 38 in the X, Y axis direction, when the difference between the diameter D of the pin hole 15 and the diameter d of the operating head 38 is "D−d=0", the centers C1, C2 of the pin hole 15 and the operating head 38 are equal. That is, in this case, the operating head 38 moves in circle instead of moving eccentrically.

Thus, in this modification example, the operating head is drive controlled in the X, Y, Z, R axis directions to adjust the gap with the pin hole. Accordingly, regardless of the diameter of the pin hole, the operating head 38 is able to favorably move eccentrically along the inner face of the pin hole 15. In this eccentric movement, the laser light is controlled to be emitted constantly to the position where the operating head 38 contacts the pin hole 15.

Embodiment 12

In the stress treatment device 24, neutral or alkaline liquid L is jetted to the inner face of the pin hole 15 as the target of operation. Therefore, when this liquid L remains and is left as it is, rust occurs in the portion where it is left. Accordingly, it is necessary to dry the pin hole 15 or the gap portion between the turbine rotor blade 10 and the disk 12 and the surroundings thereof after treatment, so as to prevent rust.

The liquid L adhering to the turbine rotor blade 10 or the disk 12 basically adheres to the surface thereof and flows down. However, the turbine rotor blade 10 and the disk 12 are coupled circumferentially and there is a gap of only about 0.4 mm between the blade fork 11 and the disk fork 13. Accordingly, the liquid L may deposit in this gap portion 125. To directly insert a drying head in this narrow gap portion 125 to blow dry gas has conventionally been difficult. Further, also on the inner face of the pin hole 15 similarly the liquid L may deposit by surface tension.

Figure 29A:
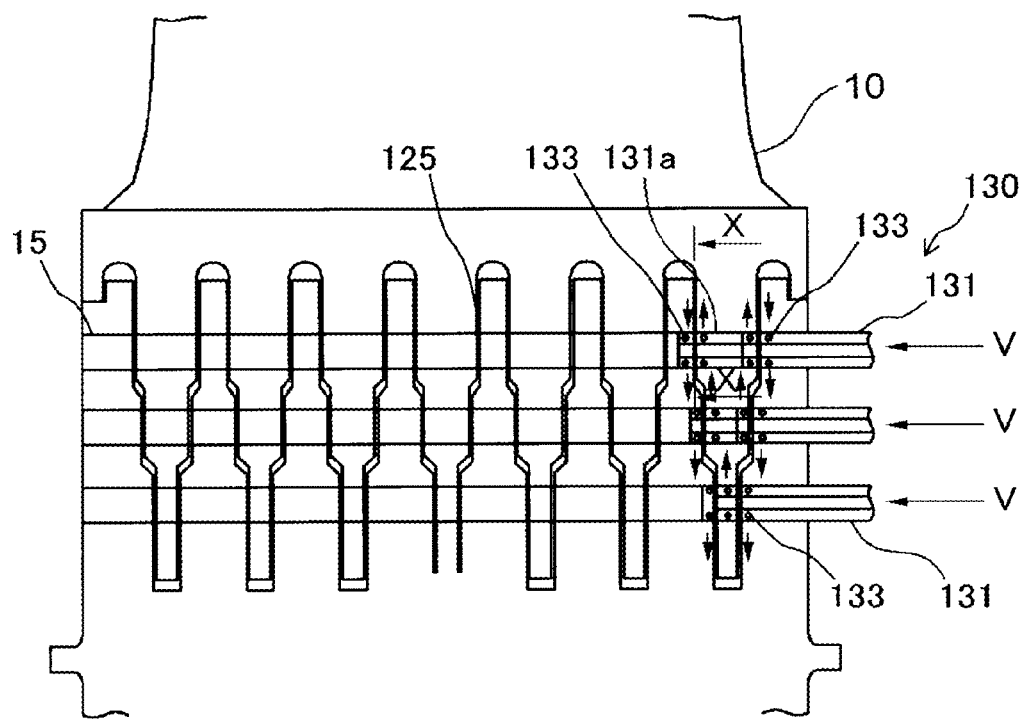
FIG. 29A is a front view of a turbine rotor blade and a disk for describing a drying device according to Embodiment 12.
Figure 29B:
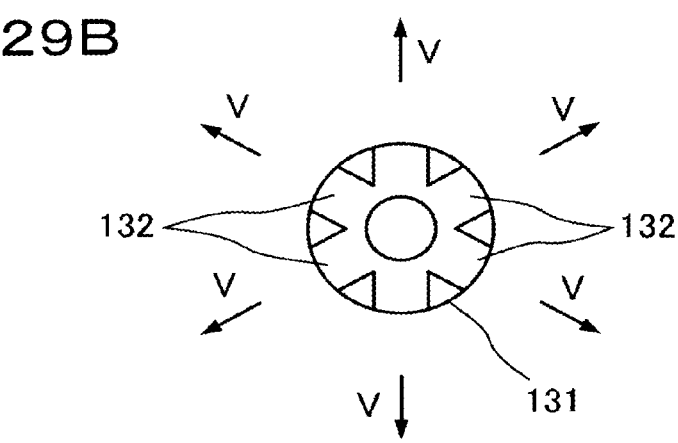
FIG. 29B is an arrow view of the drying head seen from an X direction for describing the drying device according to Embodiment 12.

FIG. 29A and FIG. 29B are views for describing a drying device 130 which dries the gap portion 125 between the turbine rotor blade 10 and the disk 12 according to embodiment 12. FIG. 29A is a front view of the turbine rotor blade 10 and the disk 12, and FIG. 29B is an allow view seeing in an X direction of a drying head 131.

The drying device 130 has a gas supply unit (not illustrated) supplying dry gas, a head moving unit (not illustrated), drying heads 131, and O-rings 133.

The gas supply unit supplies the drying heads 131 with dry gas, which is obtained by drying gas having a nitrogen content of 80% by heating with a heater to remove moisture.

The head moving unit moves the drying heads 131 in an axial direction.

The drying heads 131 are formed in a cylindrical shape and have plural through holes 132 illustrated in FIG. 29B in a circumferential face of a distal end part 131a. The number of drying heads 131 disposed corresponds to the number of pin holes 15 formed in the fork, three in the embodiment. The three drying heads 131 are arranged in three stages as illustrated in FIG. 29A corresponding to the length of the pin holes 15, and move on the inner faces of the pin holes 15 in this state of arrangement. Accordingly, all the drying heads 131 moving on the inner faces of the pin holes 15 are able to reach the position of the gap portion 125 simultaneously.

The through holes 132 are arranged, for example, radially in six directions on a circumferential face of each drying head 131 and at two positions of each drying head 131 and the distal end part 131a. The distance between these two through holes 132 is set to a length equal to the length of the pin hole 15 as the target of operation. These through holes 132 jet the dry gas supplied from the gas supply unit to the inner faces of the pin holes 15 from the inside of the drying head 131.

Four O-rings 133 are provided on a front and a rear circumferential face in the axial direction of the drying head 131 in a manner of sandwiching the through holes 132 (see FIG. 29A).

The drying heads 131 move in the axial direction along the inner faces of the pin holes 15 in which they are inserted. When they reach the position of the gap portion 125 between the blade fork 11 and the disk fork 13, the O-rings 133 seal the inner faces of the pin holes 15. Accordingly, the dry gas V supplied from the through holes 132 jets to the outside only via the gap portion 125.

Thus, in this embodiment, the dry gas can be jetted to the outside only via the gap portion. Accordingly, the dry gas is not diverted to the inner faces of the pin holes, and the liquid left in the gap portion can be removed properly, thereby allowing rust prevention.

Modification Example 1

Next, a drying head 135 drying the inner face of the pin holes 15 will be described.

Figure 30:
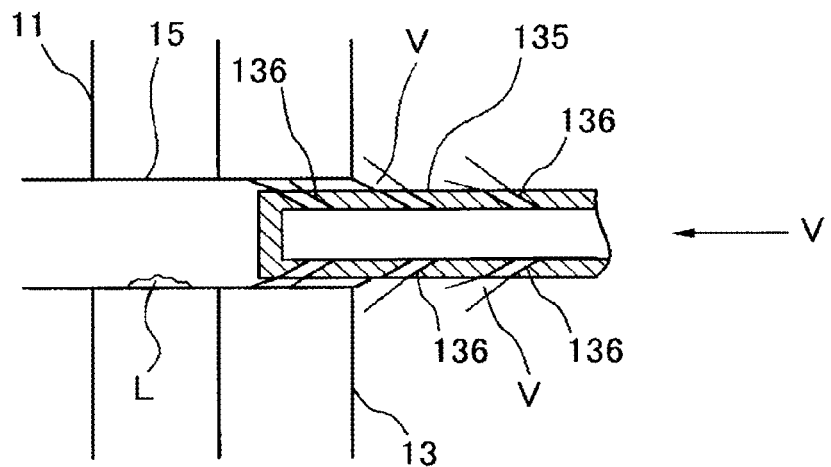
FIG. 30 is a cross-sectional view illustrating the drying head according to Modification Example 1 of Embodiment 12.

FIG. 30 is a cross-sectional view illustrating the drying head 135 according to modification example 1 of embodiment 12.

The drying head 135 is formed in a cylindrical shape and has plural through holes 136 in a circumferential face.

These plural through holes 136 are arranged on the same circumference and in an axial direction of the drying head 135. The through holes 136 are formed as oblique holes at about 45 degrees so as to jet the dry gas V obliquely forward from the inside of the drying head 135. Because the pin hole 15 is in a state of being parallel with the rotation center of the rotor 1 and with the floor face, and the liquid L remains adhering to the inner face of this pin hole 15, this structure allows to blow this liquid L forward of the drying head 135.

Thus, in this modification example, the dry gas can be jetted to the inner face of the pin hole obliquely forward of the drying head. Accordingly, the dry gas flows forward of the inner face of the pin hole, and the liquid adhering to the inner face of the pin hole can be removed properly, thereby allowing rust prevention.

Modification Example 2

Figure 31:
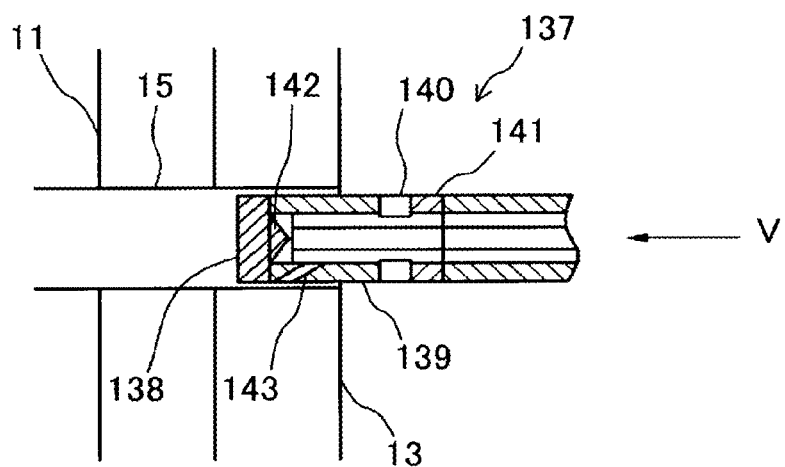
FIG. 31 is a cross-sectional view illustrating the drying head according to Modification Example 2 of Embodiment 12.

FIG. 31 is a cross-sectional view illustrating a drying head 137 according to modification example 2 of embodiment 12.

The drying head 137 includes a fixed propeller part 138, a rotating part 139, a connection ring 140, and a tubular member 141.

The fixed propeller part 138 has blades 142 in a propeller form fixed inward to a distal end of the drying head 137. The blades 142 are disposed to receive supplied dry gas V from the front.

The rotating part 139 is formed in a cylindrical shape covering the blades 142, and has a through hole 143 in a circumferential face. This through hole 143 is formed as an oblique hole at about 45 degrees so as to jet the dry gas V obliquely forward from the inside of the drying head 137, similarly to the through holes 136 of the modification example 1.

The connection ring 140 connects the rotating part 139 rotatably to the tubular member 141. The connection ring 140 is formed of, for example, a bearing which reduces frictional resistance.

When the dry gas V supplied from the tubular member 141 is jetted to the blades 142 with force at a pressure of about 0.5 MPa, the blades 142 receive reaction force. By this reaction force, rotational force is transmitted to the rotating part 139, and while rotating by this rotational force, the dry gas V can be jetted to the entire circumference of the pin hole 15 of the drying head 137 via the through hole 143.

Thus, in this modification example, the dry gas can be jetted to the inner face of the pin hole obliquely forward of the drying head from the rotating part which rotates. Accordingly, the dry gas flows forward of the inner face of the pin hole, and the liquid adhering to the inner face of the pin hole can be removed properly, thereby allowing rust prevention.

Embodiment 13

Next, the case where the inner face of a pin hole 15 is inspected after the compressive stress region is formed in the inner face of the pin hole 15 will be described.

Figure 32:
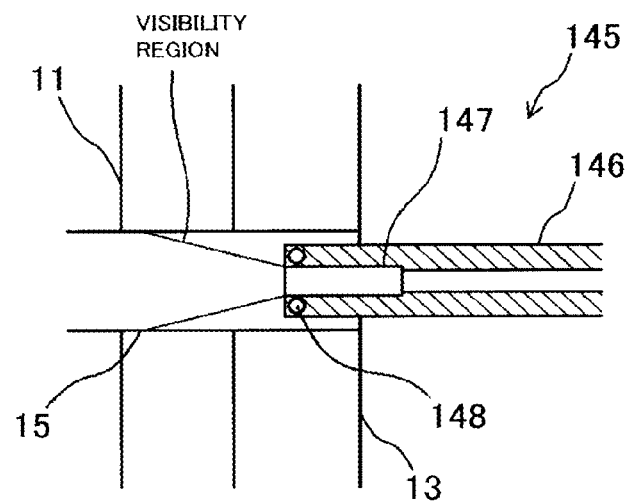
FIG. 32 is a cross-sectional view illustrating an inspection head according to Embodiment 13.

FIG. 32 is a cross-sectional view illustrating an inspection head 145 according to embodiment 13.

The pin hole 15 is generally formed to have a diameter of 10 mm to 17 mm. On the other hand, the maximum width of the blade fork 11 and the disk fork 13 is 300 mm or larger. Thus, the pin hole 15 has low luminance inside, and it is difficult to visually inspect the entire pin hole 15.

Accordingly, in this embodiment, the inspection head 145 enabling an inspection of the entire inside of the entire pin hole 15 is provided.

The inspection head 145 includes a tubular member 146, a fiber scope 147, and an illumination part 148.

The fiber scope 147 is disposed inside the tubular member 146. Further, the illumination part 148 is disposed on a distal end of the tubular member 146.

The fiber scope 147 generates a visibility region which can be visually observed in front of the tubular member 146. The fiber scope 147 is connected to a not-illustrated monitor and enables to display a video image.

The illumination part 148 is formed of a ring-shaped light, and illuminates the inner face of the pin hole 15 in the visibility region in front of the tubular member 146.

When the inspection head 145 is inserted in the pinhole 15, the inner face of the pin hole 15 within the visibility region in front is illuminated, enabling an operator to perform visual inspection.

Thus, in this embodiment, the inner face of the pin hole which is made visible by the illumination part is captured by the fiber scope to allow visual observation, and thus the entire pin hole can be inspected visually.

Embodiment 14

Next, the case where a drying operation and an inside inspection of the pin hole 15 are combined will be described.

Figure 33:
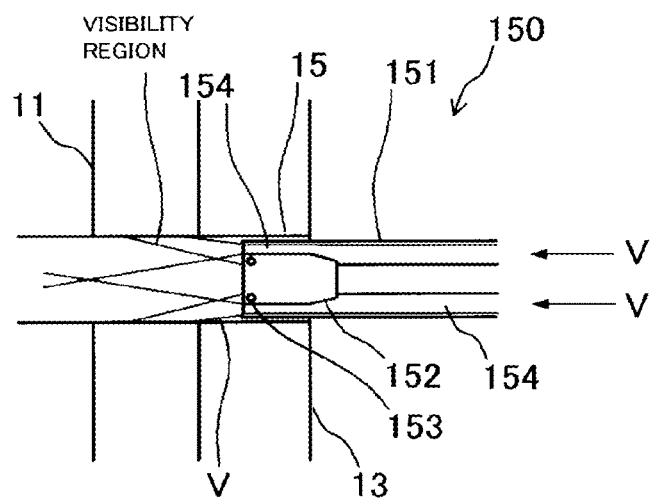
FIG. 33 is a cross-sectional view illustrating a combination head according to Embodiment 14.

FIG. 33 is a cross-sectional view illustrating a combination head 150 according to embodiment 14.

The combination head 150 includes a tubular member 151, a fiber scope 152, and an illumination part 153.

The fiber scope 152 is disposed inside the tubular member 151. A gap portion 154 is formed between an inner face of the tubular member 151 and the fiber scope 152. The tubular member 151 is connected to a gas supply unit and jets the dry gas V to the outside via the gap portion 154. Accordingly, the gap portion 154 on a distal end side of the tubular member 151 is formed to have a narrow structure.

The fiber scope 152 generates a visibility region which can be visually observed in front of the tubular member 151. The fiber scope 152 is connected to a not-illustrated monitor and enables to display a video image. Further, the illumination part 153 is disposed on a distal end of the fiber scope 152.

The illumination part 153 is formed of a ring-shaped light, and illuminates the inner face of the pin hole 15 in the visibility region in front of the tubular member 151.

When the combination head 150 is inserted in the pin hole 15, the dry gas V is jetted into the pin hole 15 from the gap portion 154 between the tubular member 151 and the fiber scope 152. At the same time as this jetting, the inner face of the pin hole 15 within the visibility region in front is illuminated, enabling an operator to perform visual inspection.

Thus, in this embodiment, while the entire pin hole is visually inspected, the inside of the pin hole can be dried simultaneously.

Embodiment 15

Next, a collecting unit which collects a cutting agent and liquid supplied to the pin hole 15 will be described.

The liquid L jetted during laser peening scatters from the opposite direction of the head inserting side of the pin hole 15.

Accordingly, in this embodiment, a collecting unit which collects a cutting agent and liquid is provided.

Figure 34:
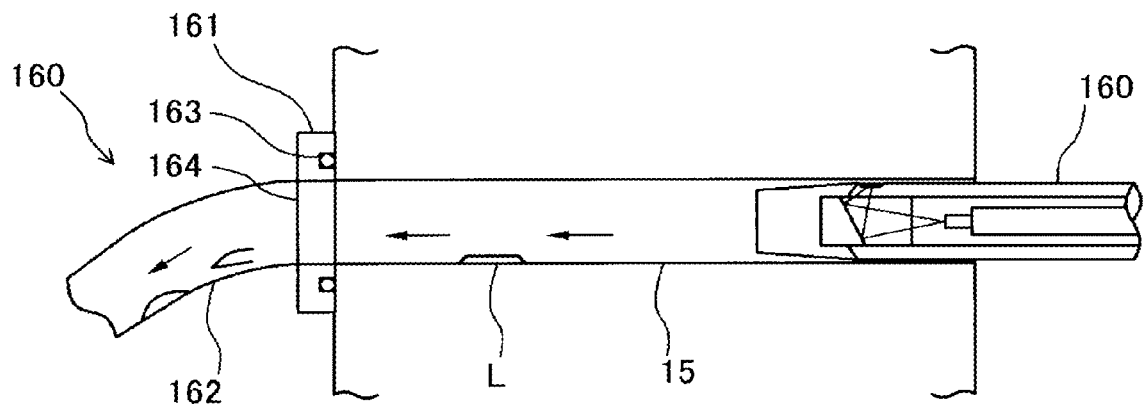
FIG. 34 is a view illustrating a collecting unit according to Embodiment 15.

FIG. 34 is a view illustrating a collecting unit 160 according to embodiment 15. The collecting unit 160 includes a flange 161, a guide pipe 162, an O-ring 163, and a not-illustrated pump.

The flange 161 has a hole 164 to which the guide pipe 162 is attached. This hole 164 is formed to have the same diameter as the pin hole 15.

The guide pipe 162 is connected to the pump and sucks the liquid L by a suction operation of the pump.

The O-ring 163 is disposed on a side face of the flange 161 in a manner of surrounding the hole 164.

The flange 161 and the O-ring 163 are attached to aside face of the fork so that the hole 164 fits with the exit part of the pin hole 15, and suction by the pump is performed, thereby taking in the liquid L scatting during operation into the guide pipe 162.

Thus, in this embodiment, since the scattering liquid is sucked in, remaining liquid in the pin hole can be reduced, and an operating time in the next work process, a drying process for example, can be reduced.

Embodiment 16

Next, a system for collecting and reusing the liquid L jetted during laser peening will be described.

Figure 35:
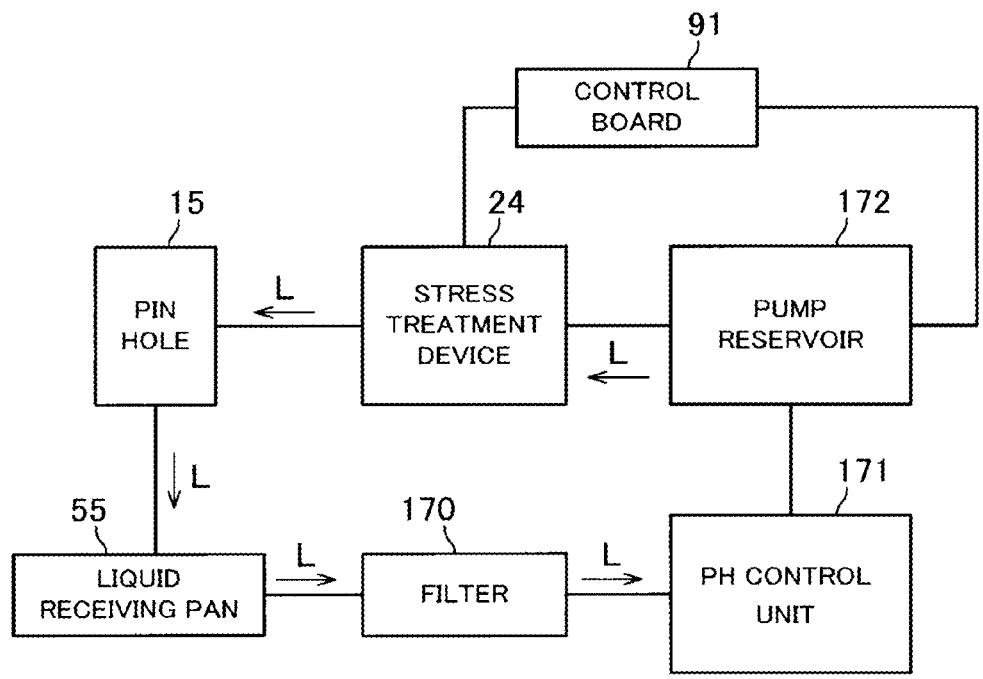
FIG. 35 is a block diagram illustrating the structure of a reuse system according to Embodiment 16 which collects and reuses liquid.

FIG. 35 is a block diagram illustrating the structure of a reuse system according to embodiment 16 which collects and reuses the liquid L.

The reuse system includes a stress treatment device 24 including a laser peening device 29, a control board 91, a liquid receiving pan 55, a filter 170, a PH control unit 171, and a pump reservoir 172. Note that in FIG. 35, a solid line indicates a flow of the liquid L, and a dashed line indicates a connection path of a control system.

The liquid receiving pan 55 accumulates the liquid L dropped from the pin hole 15 and supplies it to the filter 170.

The filter 170 has a function to filter out impurities and oil contents remaining in the pin hole 15, a minute amount of metal powder sublimed by laser peening, foreign matters mixed in from the outside, and the like. In addition, the filter 170 may be clogged when a predetermined amount of foreign matters adheres abnormally, and thus the filter needs to be replaced periodically.

The PH control unit 171 has a function to adjust the PH of the filtered liquid L. In addition, the PH of the liquid L has an effect such that the closer it is to alkaline, the more the turbine rotor blade 10 and the disk 12 are difficult to rust.

The pump reservoir 172 has a not illustrated pump, sucks up the PH adjusted liquid L and supplies this liquid to the stress treatment device 24. In addition, when the liquid L in the pump reservoir 172 becomes equal to or lower than a predetermined level, the liquid needs to be replenished.

The control board 91 controls the stress treatment device 24 and drive controls the pump of the pump reservoir 172 based on operating conditions.

The liquid L is reserved in the pump reservoir 172 and pumped up by the pump, passes through a not-illustrated flow rate detecting valve, a hose 48, and a boom 35 in this order, and is jetted via the opening portion 46a of the operating head 38.

The liquid L jetted from the opening portion 46a drops down to the liquid receiving pan 55 via the pin hole 15, and is further sucked to the filter 170 removing foreign matters. Next, the liquid L is PH adjusted by the PH control unit 171, sucked up by the pump, and is circulated to the pump reservoir 172.

Thus, in this embodiment, the liquid jetted into the pin hole is filtered, PH adjusted, and thereafter supplied again to the stress treatment device, thereby allowing reuse of the liquid. Consequently, depletion of resources can be prevented.

Embodiment 17

Figure 36:
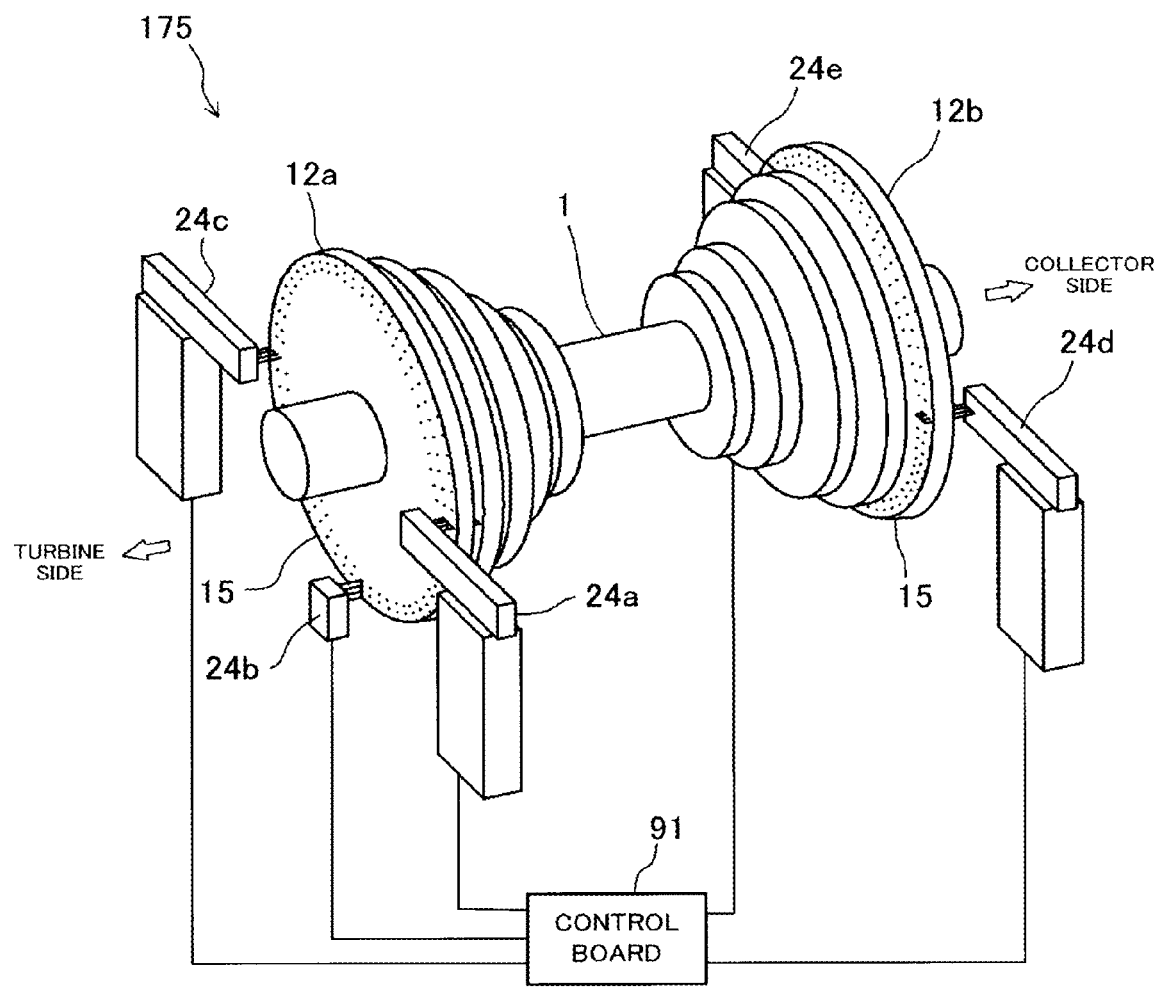
FIG. 36 is a view illustrating the structure of an operating system according to Embodiment 17.

FIG. 36 is a view illustrating the structure of an operating system 175 according to embodiment 17.

In this operating system 175, a plurality of stress treatment devices (for example, stress treatment devices 24a to 24c or stress treatment devices 24d, 24e) having similar functions to those of the above-described stress treatment device 24 are disposed at different positions on the same circumference of the disk 12*a* in a final stage. Then, the control board 91 causes these stress treatment devices to treat respective pluralities of pin holes 15 at the same timing to form compressive stress regions.

Further, in this operating system 175, a plurality of stress treatment devices (for example, stress treatment devices 24*a* and 24*d* or stress treatment devices 24*c* and 24*e*) having similar functions to those of the above-described stress treatment device 24 are disposed at positions facing the disk 12*a* in the final stage of a turbine side and the disk 12*b* in the final stage of a collector side. Then, the control board 91 causes these stress treatment devices to treat respective pluralities of pin holes 15 at the same timing to form compressive stress regions.

Further, in this operating system 175, the stress treatment devices 24*a* to 24*e* are disposed in combination. Then, the control board 91 may cause these stress treatment devices to treat respective pluralities of pin holes 15 at the same timing to form compressive stress regions. This operating system functions as "an operating system in which plural stress treatment devices are disposed at least at one of different positions on a same circumference of the rotor and positions facing the disk on a turbine side and the disk on a collector side".

Thus, in this embodiment, since the stress treatment devices are used to form the compressive stress region in the pin holes, occurrence of stress-corrosion cracking in the inner faces of the pin holes in the coupling portion of the rotor blade and the disk of the steam turbine is prevented, and fatigue strength can be improved.

Further, in this embodiment, the plural stress combination systems are disposed in combination, and the plural pin holes are treated respectively to form the compressive stress regions. Thus, simultaneous treatment is possible by one time of rotation control, which allows reduction of operating time.

Embodiment 18

Figure 37A:
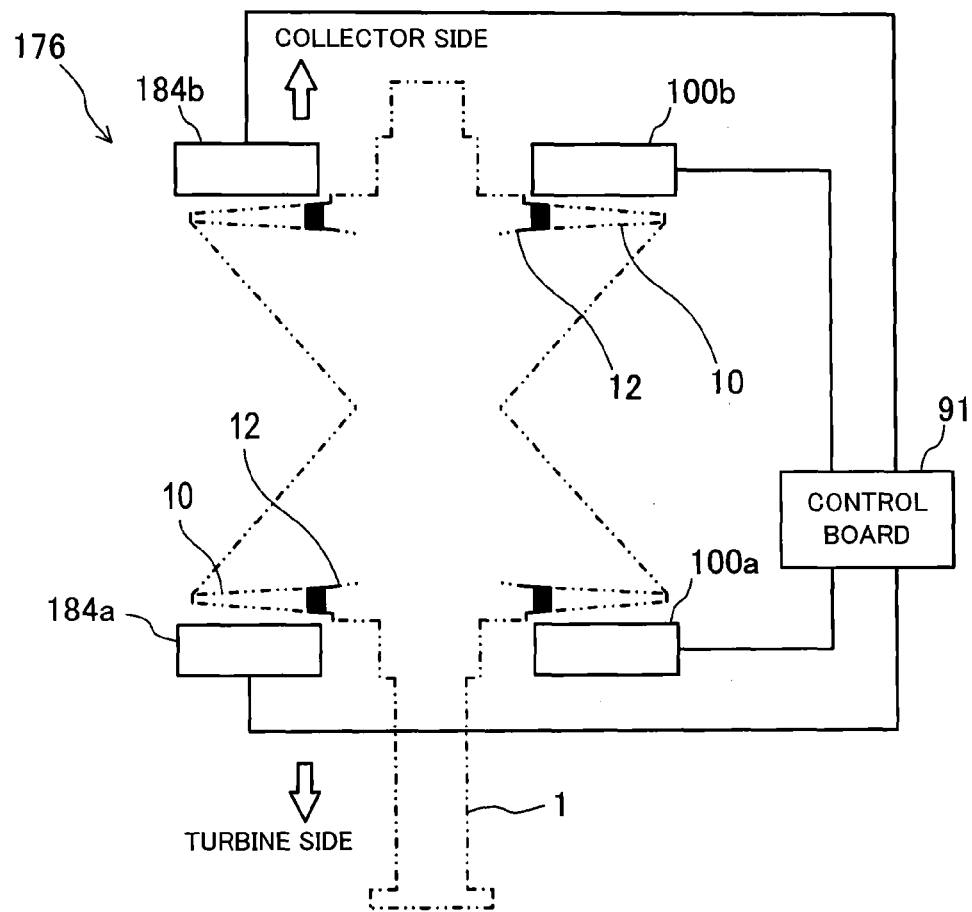
FIG. 37A is a top view of an operating system according to Embodiment 18.
Figure 37B:
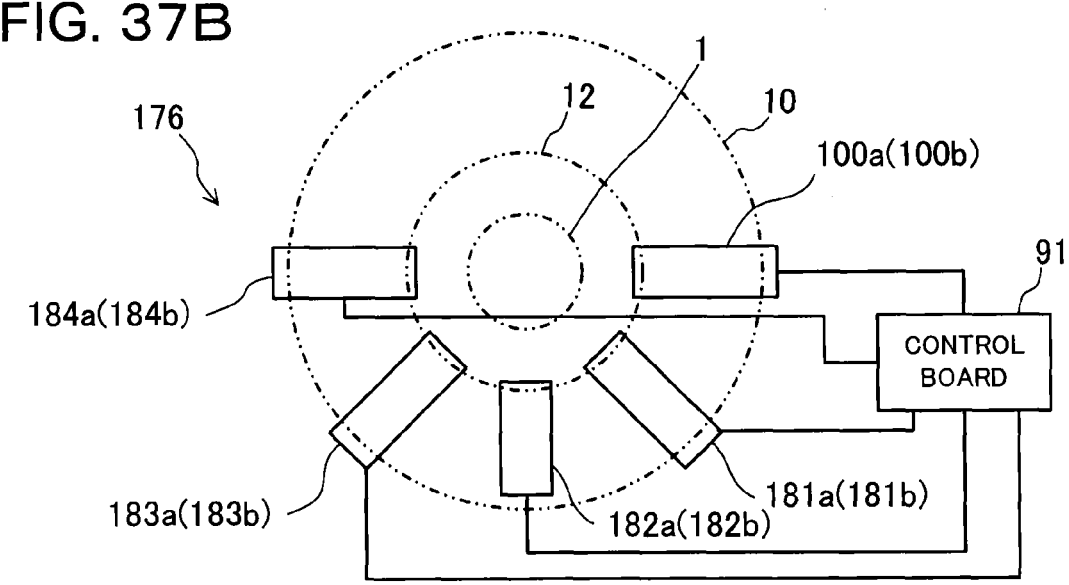
FIG. 37B is a side view of the operating system according to Embodiment 18.

FIG. 37A and FIG. 37B are views illustrating the structure of an operating system 176 according to embodiment 18. FIG. 37A is a top view, and FIG. 37B is a side view.

This operating system 176 includes reamer processing devices 100*a*, 100*b*, operating devices 181*a*, 181*b*, drying devices 182*a*, 182*b*, inspection devices 183*a*, 183*b*, pin assembling devices 184*a*, 184*b*, and a control board 91.

The reamer processing devices 100*a*, 100*b* are similar to the reamer processing device illustrated in FIG. 1A to FIG. 1C, and thus the description thereof is omitted. These reamer processing devices 100*a*, 100*b* function as a processing unit simultaneously reamer processing a turbine rotor blade having a blade fork and a disk of a rotor having a disk fork with which the blade fork engages.

The operating devices 181*a*, 181*b* form the compressive stress region in the inner faces of pin holes 15 by performing laser peening. In the case of performing laser peening, these operating devices 181*a*, 181*b* are similar to the laser peening device 29 illustrated in FIG. 5. These operating devices 181*a*, 181*b* function as "a stress treatment device including a rotor rotating unit rotating the rotor to position the disk at a predetermined position, an operating unit performing peening at the positioned predetermined position on at least one of an inner face of a pin hole of the blade fork and an inner face of a pin hole of the disk fork, so as to form a compressive stress region, and a jetting unit jetting liquid into the pin hole".

The drying devices 182*a*, 182*b* perform an operation to blow off a cutting agent, liquid, or other foreign matters remaining in the pin holes 15 after the laser peening is performed. These drying devices 182*a*, 182*b* are similar to the drying device 130 illustrated in one of FIG. 29A, FIG. 29B, FIG. 30, and FIG. 31. These drying devices 182*a*, 182*b* function as "a drying unit drying liquid jetted into the pin hole".

The inspection devices 183*a*, 183*b* check foreign matters in the pin holes 15 and an operating range after the laser peening is performed. These inspection devices 183*a*, 183*b* are similar to the inspection device including the inspection head 145 illustrated in FIG. 32. These inspection devices 183*a*, 183*b* function as "a recognizing unit imaging an image of the compressive stress region formed in the pin hole and recognizing the compressive stress region based on the image".

The pin assembling devices 184*a*, 184*b* perform an operation to insert a pin in the pin holes 15 of the blade fork 11 and the disk fork 13, in which the compressive stress region is formed, so as to assemble the turbine rotor blade 10 and the disk 12. These pin assembling devices 184*a*, 184*b* function as "an assembling unit assembling the turbine rotor blade and the disk.

In addition, besides them, it is also possible to include a device which chamfers exit and entrance parts of the pin holes 15 of the blade fork 11 and the disk fork 13 after the reamer processing, so as to alleviate stress concentration.

In this operating system 176, these devices 100*a*, 181*a* to 184*a* are disposed at different positions on the same circumference of the disk 12*a* in a final stage. Then, the control board 91 performs drive control and operating management of these devices 100*a*, 181*a* to 184*a*. The control board 91 simultaneously performs plural different operations of these devices 100*a*, 181*a* to 184*a*.

Further, in this operating system 176, these devices 100*a*, 181*a* to 184*a* and 100*b*, 181*b* to 184*b* are disposed at different positions on the same circumferences of the disks 12*a*, 12*b* in final stages, respectively. At the same time, the devices 100*a* and 100*b*, 181*a* and 181*b*, 182*a* and 182*b*, 183*a* and 183*b*, and 184*a* and 184*b* having same functions are disposed at opposing positions of the disk 12*a* on a turbine side and the disk 12*b* on a collector side, respectively. Then, the control board 91 performs drive control and operating management of these devices 100*a*, 181*a* to 184*a* and 100*b*, 181*b* to 184*b*. This control board 91 simultaneously performs plural different operations of these devices 100*a*, 181*a* to 184*a* and 100*b*, 181*b* to 184*b*.

This operating system 176 functions as "an operating system including: a processing unit simultaneously reamer processing a turbine rotor blade having a blade fork and a disk of a rotor having a disk fork with which the blade fork engages; a stress treatment device including a rotor rotating unit rotating the rotor to position the disk at a predetermined position, an operating unit performing peening at the positioned predetermined position on at least one of an inner face of a pin hole of the blade fork and an inner face of a pin hole of the disk fork, so as to form a compressive stress region, and a jetting unit jetting liquid into the pin hole; a drying unit drying liquid jetted into the pin hole; a recognizing unit imaging an image of the compressive stress region formed in the pin hole and recognizing the compressive stress region based on the image; and an assembling unit assembling the turbine rotor blade and the disk, in which the respective units are disposed at different positions on a same circumference of the rotor, or the respective units are disposed at different positions on same circumferences of the rotor and the respective units having same functions are disposed at opposing positions of the disk on a turbine side and the disk on a collector side".

Thus, in this embodiment, since the stress treatment devices are used to form the compressive stress region in the pin holes, occurrence of stress-corrosion cracking in the inner faces of the pin holes in the coupling portion of the rotor blade and the disk of the steam turbine is prevented, and fatigue strength can be improved.

Further, in this embodiment, the respective devices performing different operations for forming the compressive stress region are disposed in combination at different positions on the same circumference of a disk or disposed at opposing positions of disks, so as to perform their respective operations. Accordingly, it is possible to perform the respective operations simultaneously, and operating times and the number of times of

Embodiment 19

Next, an operating management interlock function and a pacemaker function will be described. Note that an operating management system achieving these functions is similar to the system structure illustrated in FIG. 21, and thus is described using FIG. 21.

In FIG. 21, the control board 91 has an operation recording function to record a laser irradiation history 91a and a device movement history 91b, displays these histories 91a, 91b on the monitor 92, and creates and records operating management recording information 91c based on these histories.

Further, the control board 91 performs detection of an action speed 94 of operation and an action range 95, detection of the laser peening device 29 (for example, detection of laser power insufficiency, or the like), detection of the liquid flow rate of a pump of the pump reservoir 172, detection of an operating range, and so on. Then, the control board 91 has an operating management interlock function to stop driving of the stress treatment device 24 when there is abnormality in these detection results, and display an abnormal part on the monitor 92.

In addition, detection of the liquid flow rate is performed by a flow rate detecting valve. Therefore, when the liquid flow rate is less than a prescribed rate, it is conceivable that impurities and foreign matters at the irradiation position of laser light cannot be removed, and the laser power becomes less than a prescribed condition. Accordingly, when there is a flow rate decrease, it is necessary to instruct the stress treatment device 24 to display occurrence of abnormality on the monitor 92.

Thus, in this embodiment, the system has the above-described effects and also has the operating management interlock function to detect abnormality and stop driving of the stress treatment device, and thus safety of the device can be improved.

Further, a plurality of stress treatment devices are disposed at different positions on the circumference of the disk 12a illustrated in embodiment 17 and/or at opposing positions of the disk 12a on the turbine side and the disk 12b on the collector side, and perform operations simultaneously.

In this case, the control board 91 illustrated in FIG. 21 has the operation recording function of the respective stress treatment devices, and is capable of centrally managing the information. Then, the control board 91 may also have a pacemaker function to obtain predicted times of completing operations of one another and display these predicted times on the monitor 92, and a display function to display operation records with respect to target processes.

Thus, in this embodiment, the system has the above-described effects, and also has the pacemaker function to predict completion of operations one another, thereby allowing improvement of operation efficiency.

Embodiment 20

Figure 38:
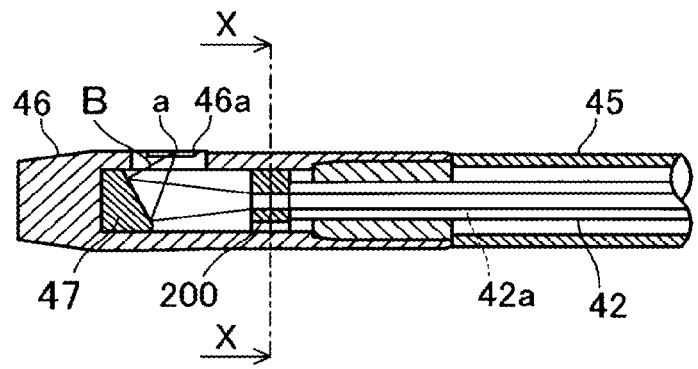
FIG. 38 is a cross-sectional view of a main part of a head distal end part of a stress treatment device according to Embodiment 20.
Figure 39:
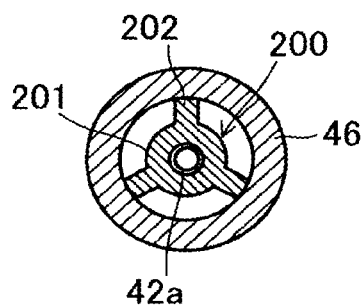
FIG. 39 is a cross-sectional view illustrating an X-X cross section of FIG. 38.
Figure 40:
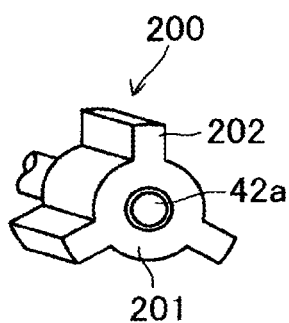
FIG. 40 is a perspective view illustrating a support part illustrated in FIG. 38.

FIG. 38 is a cross-sectional view of a main part of a head distal end part 46 of a stress treatment device according to embodiment 20. FIG. 39 is a cross-sectional view illustrating an X-X cross section of FIG. 38. FIG. 40 is a perspective view illustrating a support part 200 illustrated in FIG. 38.

When a large amount of liquid is jetted into the tubular member 45 with a distal end of an optical fiber 42 of the head distal end part 46 not being fixed in the air, the distal end of the optical fiber 42 vibrates by force of the liquid flow, and the laser light is displaced from an operating target position a. Further, when a small amount of liquid is jetted into the tubular member 45 in order to prevent this vibration, the force of the liquid is weak and a liquid membrane by this liquid is not generated favorably, and laser energy cannot be sealed only in this liquid membrane.

Accordingly, in this embodiment, as illustrated in FIG. 38 and FIG. 39, the support part 200 supporting the distal end of the optical fiber 42 is fixed in the head distal end part 46. This support part 200 is formed of a support member 201 supporting a core line 42a of the optical fiber 42, and for example three coupling members 202 disposed at equal intervals in a circumferential direction of the support member 201 to couple this support member 201 and an inner peripheral face of the head distal end part 46. These support member 201 and coupling members 202 are formed integrally. In addition, the coupling members 202 are not limited to three, and may be two or four or more.

As illustrated in FIG. 40, the center member 201 is formed in a hollow cylindrical shape having a length in a longitudinal direction which is the same as that of the coupling member 202, and supports the core line 42a of the optical fiber 42 by allowing insertion of the line as a center shaft. The coupling members 202 are each formed of a rectangular parallelepiped and fixed at three positions in the head distal end part 46, and gaps are formed among the coupling members 202 to allow liquid to flow through.

Since this support part 200 is fixed to the head distal end part 46, this part rotates with the head distal end part 46 when the head distal end part 46 rotates. At this time, the optical fiber 42 is in a state of being supported by the support part 200 and does not rotate.

In this state, when a large amount of liquid is jetted into the tubular member 45, the liquid flows to the operating target position a via the gaps among the coupling members 202. However, since the distal end of the optical fiber 42 is supported by the support part 200, it is prevented from being vibrated by the liquid flow, and the laser light can be appropriately emitted to the operating target position a. This support part 200 has the support member 201 supporting the optical fiber and the plurality of coupling members 202 provided on a periphery of the support member 201 to couple the support member 201 and the inside of the pin hole, and allows liquid jetted from the jetting unit via gaps formed among the coupling members 202 to flow through.

Thus, in this embodiment, the distal end of the optical fiber is supported by the support part fixed to the head distal end part. Consequently, a large amount of liquid can be jetted into the tubular member to generate a favorable liquid membrane, and laser peening can be performed on the operating target position of the inner face of the pin hole while the laser energy is sealed only in this liquid membrane, to thereby form the compressive stress region.

In addition, since the laser light B emitted from the reflection mirror 47 is elliptic, preferably the opening portion 46a formed in the head distal end part 46 has an elliptic shape. Moreover, preferably, a major diameter of this opening portion 46a for example (diameter in a longitudinal direction of the head distal end part 46) is set to about 3 to 10 [mm] and a minor diameter (diameter in a lateral direction of the head distal end part 46) is set to about 2 to 6 [mm].

Further, the invention of the present application is not limited to the above-described embodiments, and can be used for measures against high-cycle fatigue of, for example, fastener holes (rivet holes) of a structure such as an aircraft body for example, or oil jetting holes of a shaft of a diesel engine, industrial products such as an axle of a vehicle, and the like, and further for measures against stress-corrosion cracking in a cooling hole of a metal mold, or the like.

Further, in the above-described embodiments, the case where the stress treatment is performed in the air is described, but the present application invention is not limited thereto, and the stress treatment can be performed also in liquid.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stress treatment device having an operating unit, the operating unit comprising:
   a head unit performing peening by irradiating an inside of a hole formed in a structure with laser to form a compressive stress region in the hole;
   a laser unit having an optical fiber guiding the laser to the head unit;
   a jetting unit jetting liquid into the hole; and
   a support part supporting the optical fiber in a manner of allowing the jetted liquid to flow through and being fixed in the head unit.

2. The stress treatment device according to claim 1,
   wherein the structure includes a blade fork and a disk fork,
   the hole is a pin hole formed in the blade fork and the disk fork,
   the stress treatment device further comprising a rotor rotating unit rotating a rotor so as to position a disk of the rotor at a predetermined position, the rotor comprising:
   a turbine rotor blade having the blade fork; and
   the disk assembled by engaging with the blade fork and having the disk fork through which the pin hole is formed to penetrate together with the blade fork.

3. The stress treatment device according to claim 2,
   wherein the operating unit performs the peening on an inner face of the pin hole of the disk fork from which the turbine rotor blade is removed, so as to form the compressive stress region.

4. The stress treatment device according to claim 1,
   wherein the structure includes a blade fork of a turbine rotor blade and a disk fork; and
   wherein the turbine rotor blade comprises the disk fork formed on a disk of a rotor, and the blade fork through which the hole is formed to penetrate together with the disk fork,
   wherein the hole is a pin hole formed in the blade fork and the disk fork,
   the stress treatment device comprising the operating unit performing the peening on an inner face of the pin hole of the blade fork to form the compressive stress region.

5. The stress treatment device according to claim 3,
   wherein the operating unit further comprises a positioning unit positioning the removed turbine rotor blade in three directions: two directions corresponding to a circumferential direction and an axial direction of the rotor at the time of assembly and a longitudinal direction of the turbine rotor blade; and
   wherein the operating unit performs the peening on an inside of the pin hole of the blade fork at the positioned predetermined position to form the compressive stress region.

6. The stress treatment device according to claim 2,
   wherein the operating unit further comprises:
   a head rotating unit rotating the head unit;
   a first moving unit moving the head unit in a radial direction of the rotor at the time of assembly;
   a second moving unit moving the head unit in an axial direction of the rotor at the time of assembly; and
   a control unit controlling at least the head rotating unit, the first moving unit, and the second moving unit to move the head unit onto the same axis as the pin hole.

7. The stress treatment device according to claim 6,
   further comprising an imaging unit provided in the head unit to image an image of a pin hole on which the peening is performed in advance,
   wherein the control unit corrects a front end position of the head unit to position the head unit to the pin hole position as a target of operation based on the image of the pin hole.

8. The stress treatment device according to claim 6,
   wherein a plurality of the head units are provided at positions facing a plurality of the pin holes disposed on a same circumference among the pin holes existing in a circumferential direction of the rotor at the time of assembly, or a plurality of the pin holes disposed in a same radial direction at the time of assembly of the rotor; and
   wherein the head units perform the peening simultaneously on insides of the plurality of the pin holes on the same circumference or insides of the plurality of the pin holes in the same radial direction, so as to form the compressive stress region.

9. The stress treatment device according to claim 6,
   wherein the control unit controls the head rotating unit and the second moving unit to perform the peening in a spiral form on an inside of the pin hole, so as to form the compressive stress region sequentially.

10. The stress treatment device according to claim 6,
    wherein the control unit controls the laser unit in the pin hole, the head rotating unit, and the second moving unit based on a moving amount of the head unit in an axial direction of the rotor and an irradiation range of the laser, and performs the peening on an inside of the pin hole intermittently to partially form the compressive stress region.

11. The stress treatment device according to claim 2,
    wherein the jetting unit jets the liquid to a laser irradiation point on an inside of the pin hole to generate a liquid membrane.

12. The stress treatment device according to claim 2,
    wherein the support part has a support member supporting the optical fiber and a plurality of coupling members provided on a periphery of the support member to couple the support member and an inside of the pin hole, and allows liquid jetted from the jetting unit to flow through via gaps formed among the coupling members.

13. The stress treatment device according to claim 6, wherein the head rotating unit causes a center axis of the head unit having a smaller diameter than an inner diameter of the pin hole to move in circle in parallel with a center axis of the pin hole, so that the head unit moves eccentrically along an inner face of the pin hole.

14. The stress treatment device according to claim 6, wherein on a plurality of holders corresponding to pitches of a plurality of the pin holes which are in different radial directions of the rotor and on a same circumference; and wherein on holders corresponding to pitches of a plurality of pin holes on the same circumference as a target of operation, a plurality of the head units are rearranged and attached, and the peening is performed simultaneously on insides of the plurality of pin holes on the same circumference to form the compressive stress region.

15. An operating system, comprising:
a processing unit reamer-processing simultaneously a turbine rotor blade and a disk of a rotor, the turbine rotor blade having a blade fork, and the disk having a disk fork with which the blade fork engages;
a stress treatment device comprising:
  a rotor rotating unit rotating the rotor to position the disk at a predetermined position;
  an operating unit performing peening at the positioned predetermined position on at least one of an inner face of a pin hole of the blade fork and an inner face of a pin hole of the disk fork, so as to form a compressive stress region, the operating unit, comprising:
    a head unit performing peening;
    a laser unit having an optical fiber guiding emitted laser to the head unit and irradiating an inside of the pin hole with laser to perform peening thereon;
    a jetting unit jetting liquid into the pin hole; and
    a support part supporting the optical fiber in a manner of allowing the jetted liquid to flow through and being fixed in the head unit;
  a drying unit drying liquid jetted into the pin hole;
  a recognizing unit imaging an image of the compressive stress region formed in the pin hole and recognizing the compressive stress region based on the image; and
  an assembling unit assembling the turbine rotor blade and the disk,
wherein the respective units are disposed at different positions on a same circumference of the rotor, or the respective units are disposed at different positions on same circumferences of the rotor and the respective units having same functions are disposed at opposing positions of the disk on a turbine side and the disk on a collector side.

16. A method of making a turbine, comprising:
reamer processing a hole on a blade fork of a turbine rotor blade to enlarge a diameter of the hole;
laser-peening processing an inside surface of the hole to generate a compressive stress region on the inside surface; and
inserting a pin into the hole to fix the turbine rotor blade to a disk of a rotor.

17. The method according to claim 16, further comprising:
reamer processing a second hole on the disk fork of the rotor to enlarge a diameter of the second hole;
laser-peening processing a second inside surface of the second hole to generate a second compressive stress region on the second inside surface.

18. The method according to claim 16, wherein the step of laser-peening processing includes irradiating the inside surface with laser while a liquid is jetted into the hole.

* * * * *